United States Patent
Hung et al.

(10) Patent No.: US 9,651,678 B2
(45) Date of Patent: *May 16, 2017

(54) SYSTEM AND METHOD FOR PROVIDING LOCATION INFORMATION ON MOBILE DEVICES

(71) Applicant: BlackBerry Limited, Waterloo (CA)

(72) Inventors: Michael Hin Kai Hung, Toronto (CA); Robert Kline, Richmond Hill (CA)

(73) Assignee: BlackBerry Limited, Waterloo, Ontario (CA)

( * ) Notice: Subject to any disclaimer, the term of this patent is extended or adjusted under 35 U.S.C. 154(b) by 816 days.

This patent is subject to a terminal disclaimer.

(21) Appl. No.: 14/035,178

(22) Filed: Sep. 24, 2013

(65) Prior Publication Data
US 2014/0022127 A1 Jan. 23, 2014

Related U.S. Application Data

(63) Continuation of application No. 12/777,546, filed on May 11, 2010, now Pat. No. 8,587,476.

(51) Int. Cl.
| | |
|---|---|
| *G01S 19/48* | (2010.01) |
| *G01S 19/14* | (2010.01) |
| *G01S 19/34* | (2010.01) |
| *G01S 19/51* | (2010.01) |
| *H04W 4/02* | (2009.01) |

(52) U.S. Cl.
CPC .............. *G01S 19/48* (2013.01); *G01S 19/14* (2013.01); *G01S 19/34* (2013.01); *G01S 19/51* (2013.01); *H04W 4/021* (2013.01); *H04W 4/023* (2013.01)

(58) Field of Classification Search
CPC ........ G01S 19/34; G01S 19/48; G01S 5/0072; G01S 5/0263; H04W 4/021; H04W 4/023
See application file for complete search history.

(56) References Cited

U.S. PATENT DOCUMENTS

| | | |
|---|---|---|
| 6,438,381 B1 | 8/2002 | Alberth, Jr. et al. |
| 6,618,593 B1 | 9/2003 | Drutman et al. |

(Continued)

OTHER PUBLICATIONS

Amir, A. et al. "Buddy tracking-efficient proximity detection among mobile friends"; INFOCOM 2004, Twenty-third Annual Joint Conference of the IEEE Computer and Communications Societies, Volumve: 1, Publication Year: 2004.

(Continued)

*Primary Examiner* — Cassie Galt
(74) *Attorney, Agent, or Firm* — Thomas S. Grzesik; Fleit Gibbons Gutman Bongini & Bianco P.L.

(57) ABSTRACT

A system and method for activating a GPS receiver or a WiFi receiver on a mobile device may be provided, which comprises determining an approximate location of the mobile device. The approximate location of the mobile device may be determined using cell tower location information. If the approximate location of the mobile device is within a predetermined distance from a desired location, or is "close enough", then the GPS receiver or the WiFi receiver is activated. The GPS receiver or the WiFi receiver is activated to determine a more accurate location of the mobile device. The approximate and the more accurate location information may be exchanged with another mobile device to allow the user to find one another.

23 Claims, 23 Drawing Sheets

(56) References Cited

U.S. PATENT DOCUMENTS

| | | | |
|---|---|---|---|
| 6,819,919 | B1 | 11/2004 | Tanaka |
| 7,026,984 | B1 | 4/2006 | Thandu et al. |
| 7,289,814 | B2 | 10/2007 | Amir et al. |
| 7,660,588 | B2 | 2/2010 | Sheynblat et al. |
| 2003/0148771 | A1 | 8/2003 | de Verteuil |
| 2007/0270159 | A1* | 11/2007 | Lohtia ............... H04L 12/189 455/456.1 |
| 2009/0058720 | A1 | 3/2009 | Shaw et al. |
| 2009/0075651 | A1 | 3/2009 | MacNaughtan et al. |
| 2009/0075677 | A1* | 3/2009 | Seger ............... G08B 21/0261 455/456.6 |
| 2009/0312032 | A1 | 12/2009 | Bornstein et al. |
| 2010/0279706 | A1 | 11/2010 | Dickie |
| 2010/0325194 | A1* | 12/2010 | Williamson ............ H04W 4/02 709/203 |

OTHER PUBLICATIONS

Hybrid positioning system; http://en.wikipedia.org/wiki/Hybrid_positioning_system; Accessed on Dec. 24, 2009.

Navizon; http://en.wikipedia.org/wiki/Navizon; Accessed on Dec. 24, 2009.

Skyhook Wireless; http://www.skyhookwireless.com/howitworks/; Accessed on Dec. 24, 2009.

Küpper, A. et al.; "Efficient proximity and separation detection among mobile targets for supporting location-based community services"; SIGMOBILE Mobile Computing and Communications Review; Jul. 2006; vol. 10, Issue 3; pp. 1 to 12; ACM.

Locate your friends in real time with Google Latitude; Section copied from http://googlemobile.blogspot.com/2009/02/locate-your-friends-in-real-time-with.html; Accessed at least as early as Oct. 26, 2009.

Niemeijer, Reint; Search Report from corresponding European Application No. 10162602.6; search completed Oct. 19, 2010.

Deblauwe, N. et al.; "Combining GPS and GSM Cell-ID positioning for Proactive Location-Based Services"; Proceedings of the 4th Annual International Conference on Mobile and Ubiquitous Systems: Computing, Networking and Sercices, Piscataway, NJ, U.S.A., Aug. 2007; pp. 1 to 7; IEEE; ISBN: 978-1-4244-1024-8.

* cited by examiner

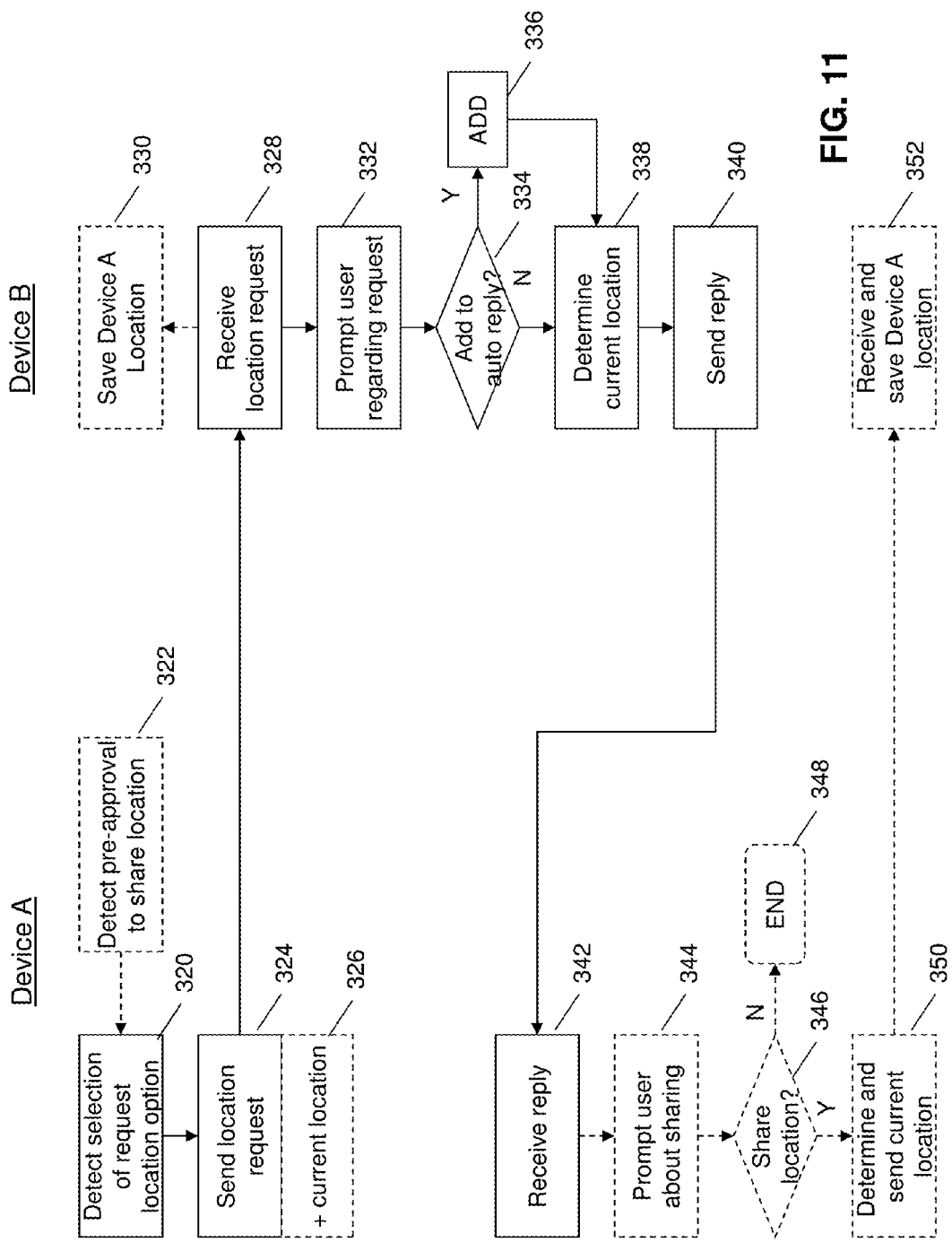

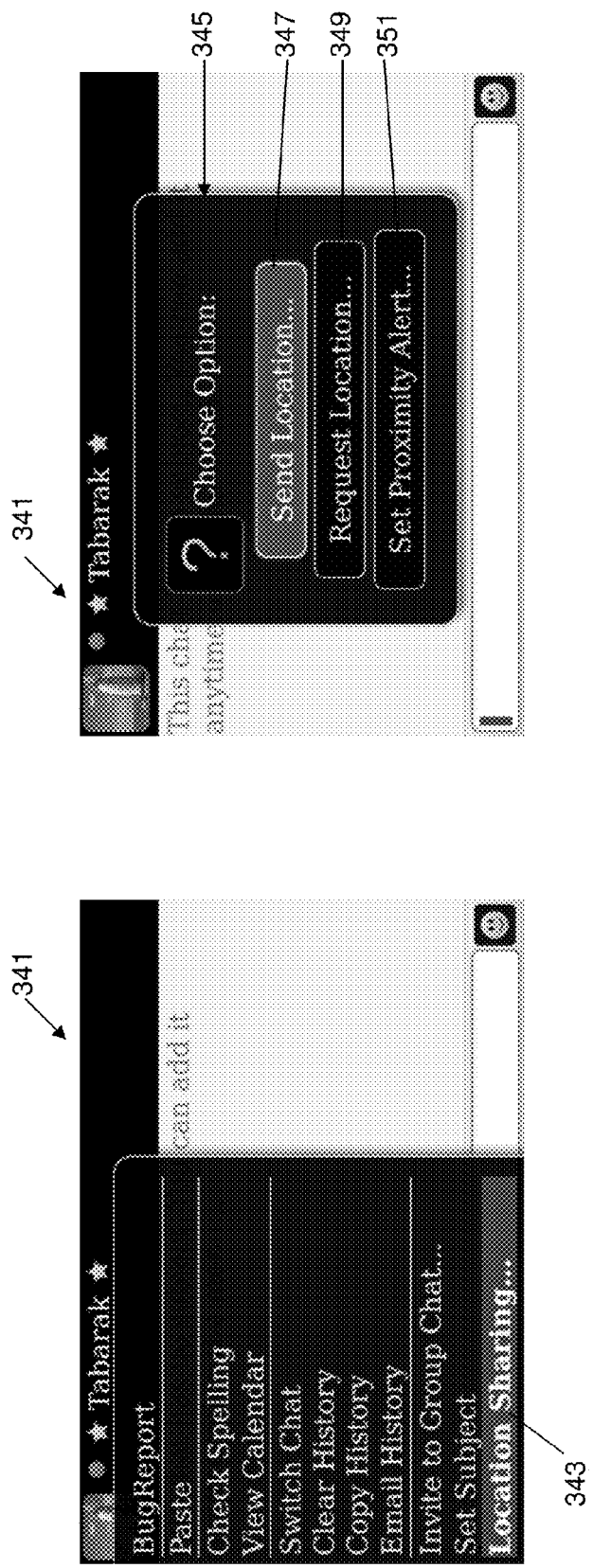

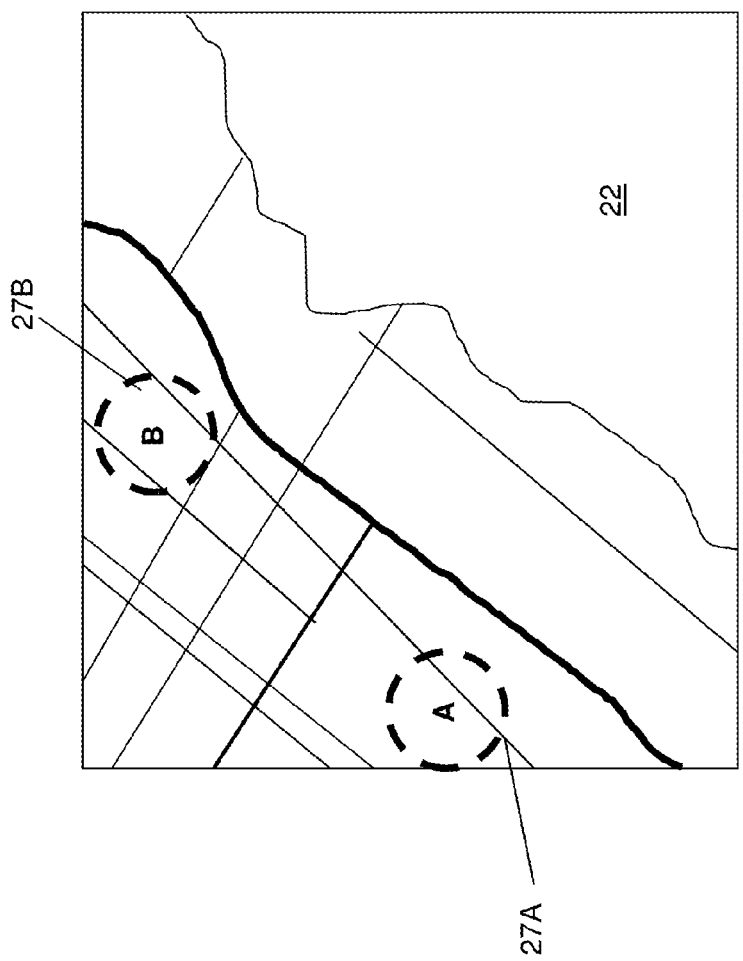

SYSTEM AND METHOD FOR PROVIDING LOCATION INFORMATION ON MOBILE DEVICES

CROSS-REFERENCE TO RELATED APPLICATIONS

This application is a continuation of U.S. patent application Ser. No. 12/777,546 filed on May 11, 2010, the entire contents of which are hereby incorporated by reference.

TECHNICAL FIELD

The following relates to systems and methods for providing location information on mobile devices.

BACKGROUND

Instant messaging has become a popular way of communicating with others, in particular using mobile technologies such as smart phones and laptops. The mobility of these technologies not only allows users to communicate with each other at any time, but also from virtually any location, e.g. using email, voice, instant messaging, SMS, etc.

Although communication media such as instant messaging can allow users to exchange messages from anywhere, in particular when they are geographically separated, users may wish to know where others are and may even use instant messaging as a tool to coordinate meeting arrangements.

BRIEF DESCRIPTION OF THE DRAWINGS

Embodiments will now be described by way of example only with reference to the appended drawings wherein:

FIG. 11 is a flow chart illustrating example computer executable instructions for a mobile device requesting location information from another mobile device and optionally sharing the current location thereof.

FIG. 12(a) is a screen shot of an example GUI for sharing location information with another user.

FIG. 12(b) is a screen shot of another example GUI for selecting the different ways of sharing location information, with the option to send location information being highlighted.

FIG. 13(a) is a screen shot of an example GUI for a maps application showing a region of uncertainty for each of a pair of mobile devices derived from cell tower location information.

DETAILED DESCRIPTION OF THE DRAWINGS

Figure 1:
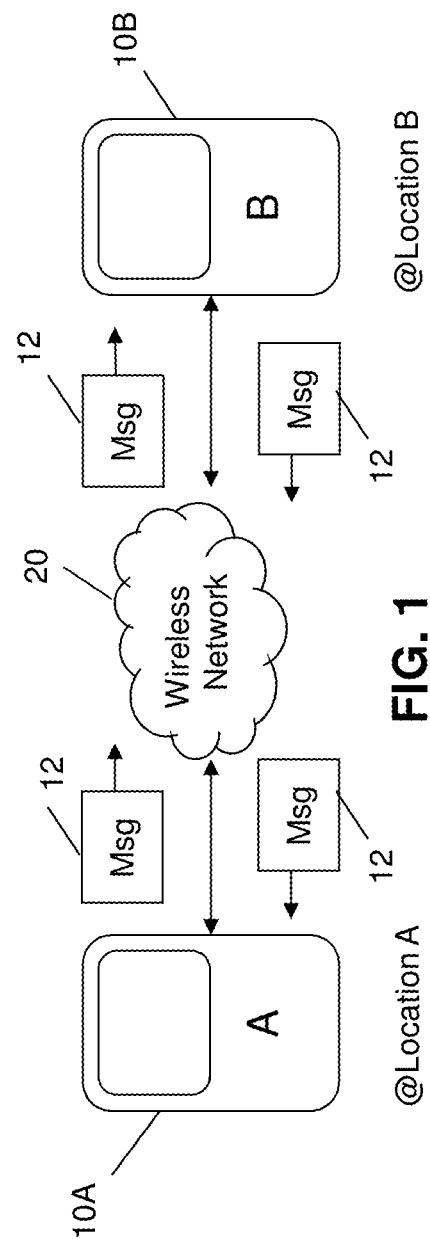
FIG. 1 is a block diagram illustrating an example exchange of messages between a pair of mobile devices over a wireless network.

The location of a mobile device may be determined using various types of location measurement systems. Non-limiting examples of such location measurement systems include GPS systems, systems that use cell-tower location, systems that use WiFi, WiMAX, or Bluetooth® base station location, systems that subscribe to location based services (LBS), etc. However, determining the location of a mobile device using a location measurement system may incur various penalties.

Examples of such penalties include the consumption of data resources on a mobile device, the consumption of bandwidth, the consumption of battery power, and cost (e.g. monetary) to use location services.

In order to reduce the various penalties associated with determining a mobile device's location, a system and a method are provided to control the use of a location measurement system on a mobile device. In particular, a first location measurement is obtained pertaining to the mobile device. The first location may be obtained from various sources, such as cell-tower information, manual input, etc. If the first location measurement is within a predetermined distance from a desired location (e.g. close enough), then the use of the location measurement system is initiated to obtain a second location. In this way, the use of the location measurement system and its associated penalties are reduced. Further details in this regard are discussed below.

In cases where an instant messaging (IM) user would like to ascertain the location of his/her buddy, e.g. when they are about to meet at an agreed upon location, rather than exchange several messages to determine each other's whereabouts, location information available to mobile devices providing the IM services can be exchanged to provide more accurate information to each user.

One example mechanism to determine a mobile device's current location is using an on-board GPS receiver and an associated GPS service. However, both devices need to have GPS capabilities and both GPS receivers would need to be turned on. Therefore, to exchange GPS information requires some coordination by the mobile devices. Moreover, the use of GPS is known to require significant battery power. Therefore, the amount of time that GPS is used should be minimized to avoid wasting battery power. In order to minimize the use of GPS on a mobile device, it has been realized that GPS should not be used when the mobile devices trying to find each other are relatively far apart from one another because the time for which the GPS would be needed until the devices are within a desired distance can be relatively long.

Another example mechanism to determine a mobile device's current location is using an on-board WiFi receiver and an associated WiFi service. For example, based on the location of a WiFi router or WiFi base and the WiFi signal strength, the location of a mobile device may be determined. However, using WiFi is also known to require significant battery power.

Another example mechanism to determine a mobile device's current location is using cell information, wherein the location of a device utilizing a certain cell tower can be estimated within a region of uncertainty based on the physical location of the cell tower, its associated range, and the signal strength. It can be appreciated that one or more cell tower signals may be used to measure the location of a mobile device.

Other example mechanisms for determining location include WiMAX receivers, Bluetooth® receivers, RFID antennas, etc. The above mechanisms may also be used in combination with one another in LBS-type systems, where the LBS determines the location of a mobile device to send to the mobile device.

Rather than rely on using a certain location measurement system, it has been found that a staged approach can enable mobile devices to progressively find one another while reducing the incurred penalties (e.g. battery power consumption, bandwidth consumption, costs, etc.). In order to balance these competing objectives, a first location measurement is obtained to determine a region of uncertainty for each mobile device and the regions of uncertainty are tracked until it is determined that the mobile devices are "close enough", e.g. when the regions intersect or having outer bounds which are within a predetermined proximity. A mobile device may also be considered close enough to a desired destination (e.g. a fixed location, another mobile device, etc.), when the available resolution of location information is less than the desired resolution of location information. In other words, the approximate location information is sufficient to locate the general desired destination, although it is insufficient to more accurately locate the desired destination as perceived by a user. The first location measurement may be obtained from various sources, such as cell-tower information, WiFi, manual input from a user, etc. Once it is determined that the mobile devices are close enough, a location measurement system (e.g. GPS, WiFi, etc.) can be used to get a more accurate estimate of each device's location and proximity. Since the mobile devices are relatively close to each other, the amount or frequency of the location measurement system's usage can be reduced. In this way, the first location measurement and region of uncertainty can be used as a coarse approximation of location, and when the coarse approximation indicates the devices are relatively close, a finer measurement or more accurate location determination can be made using, for example, GPS or WiFi.

In order to exchange such location information and in some embodiments to initiate such an exchange, it has also been found that a request/reply protocol can be established that allows one mobile device user to request a location and receive a reply based on a prompt response or default permission from the other mobile device. This allows mobile device users to more conveniently initiate location tracking for other individuals, e.g. when they are about to meet, as well as establish permissions for certain devices such that location information can be shared with minimal user interactions.

The principles described herein may also be applied to a user using a mobile device to determine their own location relative to a desired destination. For example, based on the cell tower information, a region of uncertainty of the mobile device may be determined. If the mobile device's region of uncertainty is close enough to the desired destination, then the mobile device's location measurement system may be activated.

More generally, a system and method are provided for controlling use of a location measurement system on a mobile device, comprising: obtaining a first location measurement pertaining to the mobile device; and, if the first location measurement is within a predetermined distance from a desired location, initiating use of the location measurement system to obtain a second location measurement pertaining to the mobile device. The first location measurement may be an approximate location measurement and the second location measurement may be an accurate location measurement. The location measurement system may be a GPS receiver, WiFi receiver, WiMAX receiver, or a Bluetooth® receiver. The first location measurement may be obtained using cell tower location information, user input, or WiMAX base-station location information. In another aspect, the first location measurement and the desired location may also be displayed on the mobile device. In another aspect, upon determining the first measurement location, it may be displayed on the mobile device. It may also be appreciated that the approximate location may be perceived as a region of uncertainty in which the mobile device is located within.

It can be appreciated that the desired location may be the location of another mobile device and, more particularly, the first location measurement of the other mobile device determined using cell tower information. Thus, upon activating the location measurement system to determine a second location measurement, e.g. a more accurate location of the mobile device, the second location measurement is sent to the other mobile device. Further, if the mobile device is pre-approved to share the first location measurement, e.g. approximate location, with the other mobile device, then the mobile device may automatically share the first location measurement with the other mobile device.

The following examples include communications between mobile or handheld devices, which will be commonly referred to as mobile devices hereinafter and referred to by numeral 10.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a smart phone, data messaging device, a two-way pager, a cellular telephone with data messaging capabilities, a wireless Internet appliance, or a data communication device (with or without telephony capabilities).

Turning now to the drawings, FIG. 1 illustrates an example exchange of messages 12 between a first mobile device for user A, namely mobile device 10A, and a second mobile device for user B, namely mobile device 10B. The messages 12 are exchanged in this example over a wireless network 20 and the messages 12 may be IM, SMS, email, or associated with any other suitable messaging medium. FIG. 1 illustrates that the wireless capabilities of mobile devices 10 enable, for example, mobile device 10A to send and receive messages from any location A, while mobile device 10B sends and receives messages from any location B.

Figure 2A:
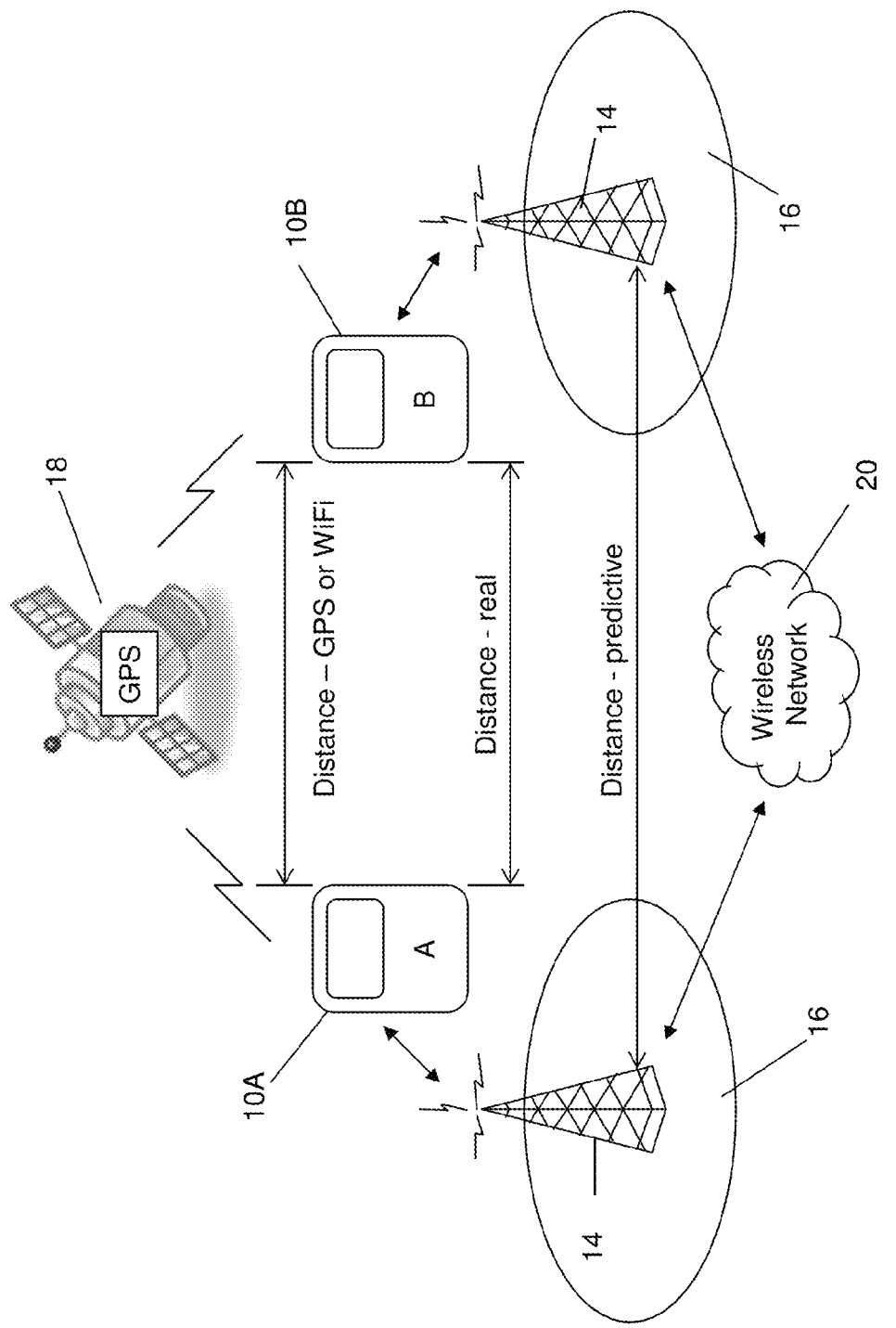
FIG. 2(a) is a pictorial schematic diagram illustrating real versus predictive distances associated with mobile devices in relation to cell towers and to each other.

FIG. 2(a) illustrates that the mobile devices 10A, 10B, may gain access to the wireless network 20 via one or more cellular towers 14 as is well known in the art. Each cellular tower 14 comprises an access region 16 which represents its range for communicating with any particular mobile device 10. Also shown is a global positioning system (GPS) 18 which, typically, through a network of satellites, provides relatively accurate location based information for a connectable mobile device 10 as is well known in the art. FIG. 2(a) also illustrates that the mobile devices 10A, 10B, based on their current locations, are separated by a real, physical distance. If the users of the mobile devices 10A, 10B wish to find one another, they would typically be interested in where the other mobile device 10 and how far they are from each other. Since the mobile devices 10A, 10B can exchange messages 12 from anywhere, the real distance is generally difficult to determine manually. Although each user could try and determine their location and exchange this information, e.g. via IM or email, they would then need to calculate the actual distance. This can be error prone and time consuming. Therefore, the GPS 18 can be used to determine locations and distances, or predictive locations can be ascertained based on proximate cellular towers 14 to determine a predictive distance. In the following, both GPS locations and predictive, cellular-based locations are used to balance the competing objectives of accuracy and battery power and performance of the mobile devices 10.

Although not show, it can be appreciated that the mobile device 10A, 10B may also gain access to a wireless network through other wireless technologies, such as WiMAX, WiFi, etc. As discussed above, the approximate locations of the mobile devices 10A, 10B may be determined using cell tower location information, or manual input from a user (e.g. inserting postal code, zip code, or nearest intersection), or from WiMAX base-station location information. For example, similar to the principles of using cell tower location information to determine the approximate location of a mobile device, the location of a WiMAX base-station may be used to determine location information.

Figure 2B:
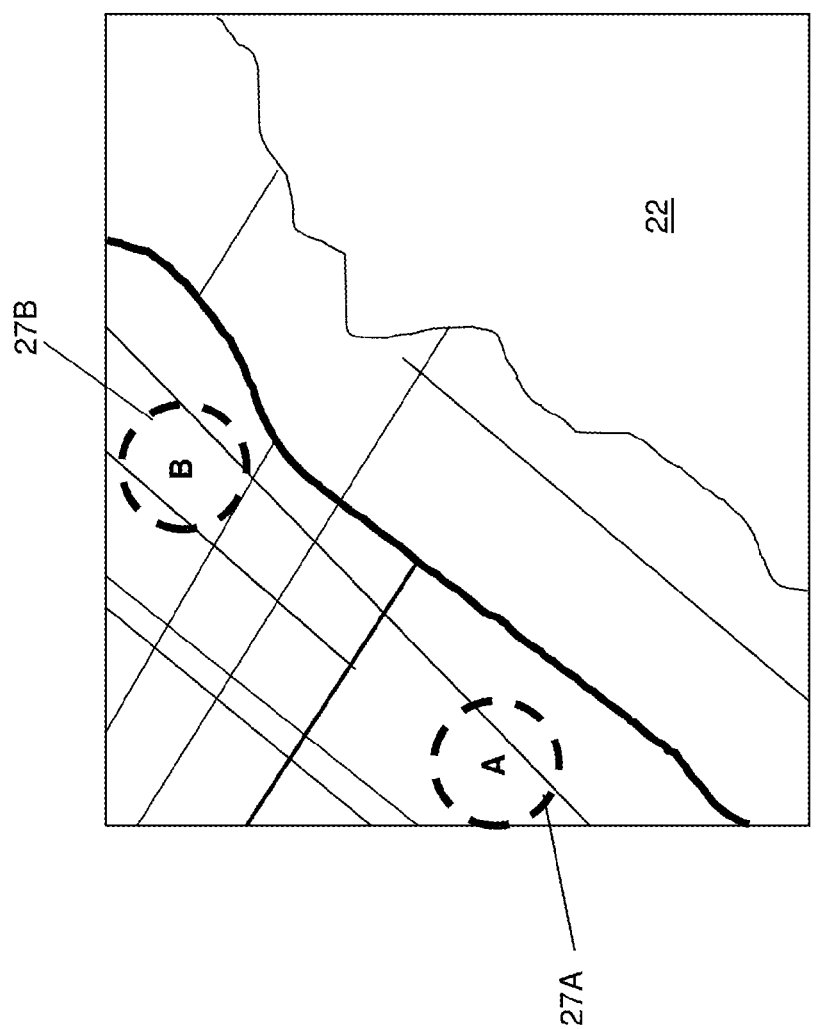
FIG. 2(b) is a screen shot of an example graphical user interface (GUI) for a maps application showing locations for the mobile devices shown in FIG. 1 and FIG. 2(a).

FIG. 2(b) illustrates one example of a graphical user interface (GUI) showing a map 22 that also provides location information for each mobile device 10 as a landmark. The approximate location 27A of mobile device 10a and the approximate location 27B of mobile device 27B are illustrated with a dotted line. It can be appreciated that the actual location, for example, of mobile device 10A may be anywhere within the region of uncertainty marked by the approximate location 27A. The region of uncertainty may be of any shape, and the illustrated circular shape is for example only. The approximate locations information can be updated as the mobile devices 10 move and, in the event the mobile devices 10 are trying to find one another, this information can be useful in determining where another person is and how far away they are, e.g. to determine how long it will take to meet up. For example, if two users are meant to be meeting at a restaurant and one arrives early, they could use the mechanisms described below to determine where the other user is, how far away they are, and thus approximately how long it will be until they arrive. This information can then be used to allow the user that is waiting to fill time with another activity or to change the meeting plans, etc. When coupled with IM capabilities, the users are therefore able to conveniently track each other to remove the uncertainty associated with waiting for others to arrive at a location.

The mobile devices 10A, 10B can also be one that is used in a system that is configured for continuously routing all forms of pushed information from a host system 25 to the mobile devices 10A, 10B. One example of such a system will now be described making reference to FIG. 3. It will be appreciated that a mobile device may be generally referred to by numeral 10 without a suffix where appropriate.

Figure 3:
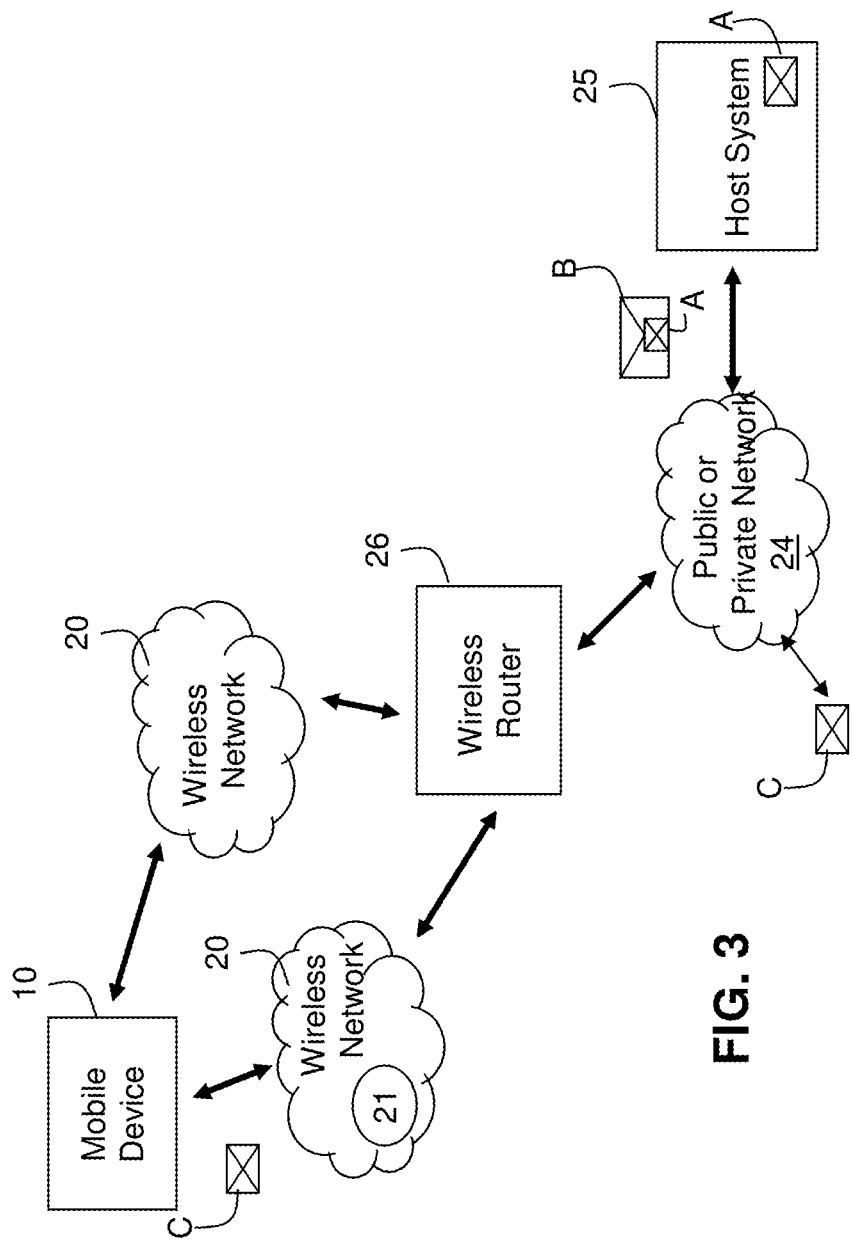
FIG. 3 is a schematic diagram illustrating a system in which data items are pushed from a host system to a mobile device.

FIG. 3 is an example system diagram showing the redirection of user data items (such as message A or C) from a corporate enterprise computer system (host system) 25 to the user's mobile device 10 via a wireless router 26. The wireless router 26 provides the wireless connectivity functionality as it acts to both abstract most of the wireless network's 20 complexities, and it also implements features necessary to support pushing data to the mobile device 10. Although not shown, a plurality of mobile devices may access data from the host system 25. In this example, message A in FIG. 3 represents an internal message sent from, e.g. a desktop computer (not shown) within the host system 25, to any number of server computers in the corporate network (e.g. LAN), which may, in general, include a database server, a calendar server, an E-mail server or a voice-mail server.

Message C in FIG. 3 represents an external message from a sender that is not directly connected to the host system 25, such as the user's mobile device 10, some other user's mobile device (not shown), or any user connected to the public or private network 24 (e.g. the Internet). Message C could be e-mail, voice-mail, calendar information, database updates, web-page updates or could even represent a command message from the user's mobile device 10 to the host system 25. The host system 25 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be adapted for communication within wireless network 20 via wireless links, as required by each wireless network 20 being used. As an illustrative example of the operation for a wireless router 26 shown in FIG. 1, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 8) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations.

Figure 4:
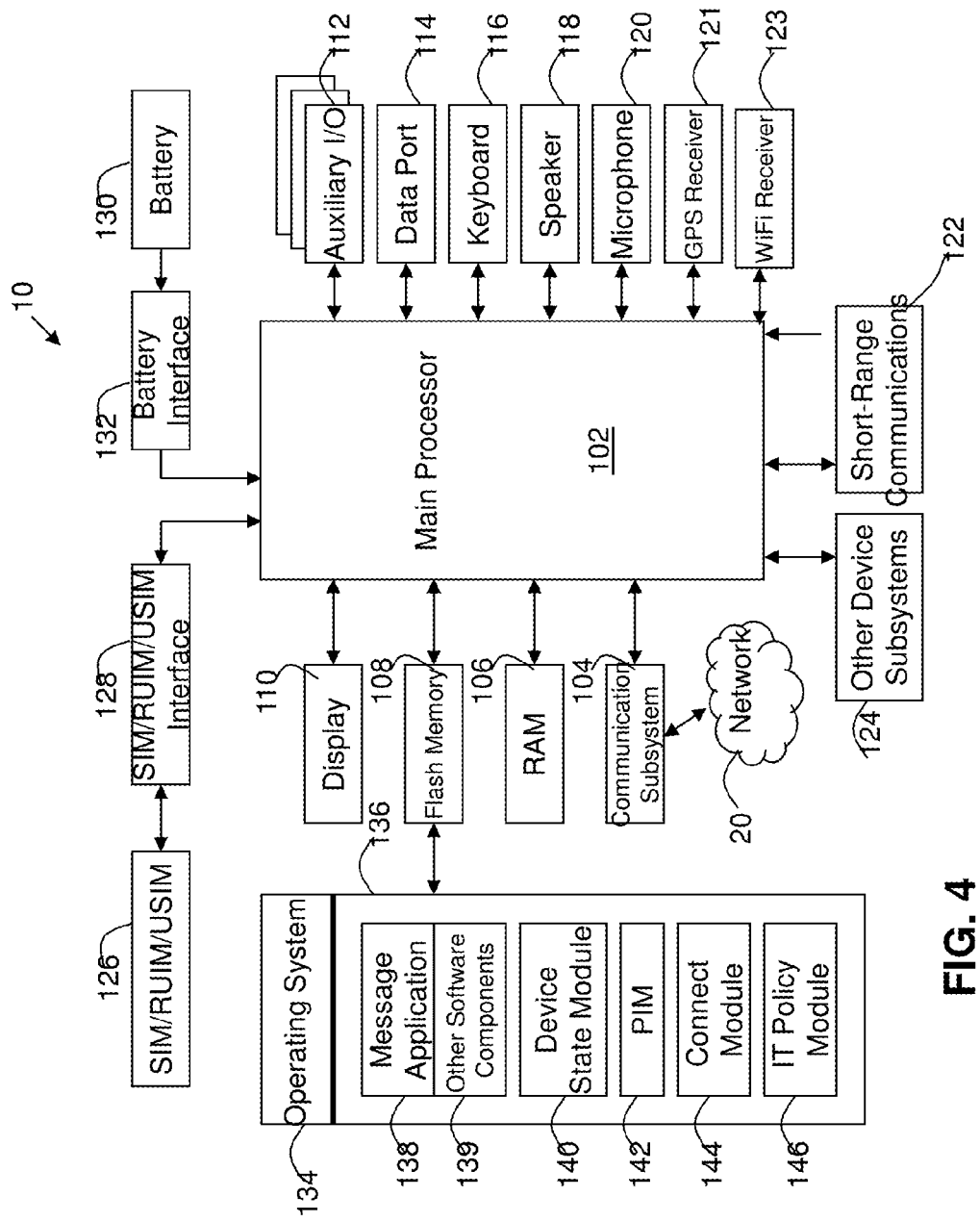
FIG. 4 is a block diagram of an example embodiment of a mobile device.

An example configuration for the mobile device 10 is illustrated in FIGS. 4-7. Referring first to FIG. 4, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, a WiFi receiver 123, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10. A GPS receiver 121 is also provided for connecting to a GPS 18 and obtaining location-specific information such as an absolute location or a distance to another location, etc.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

Figure 5:
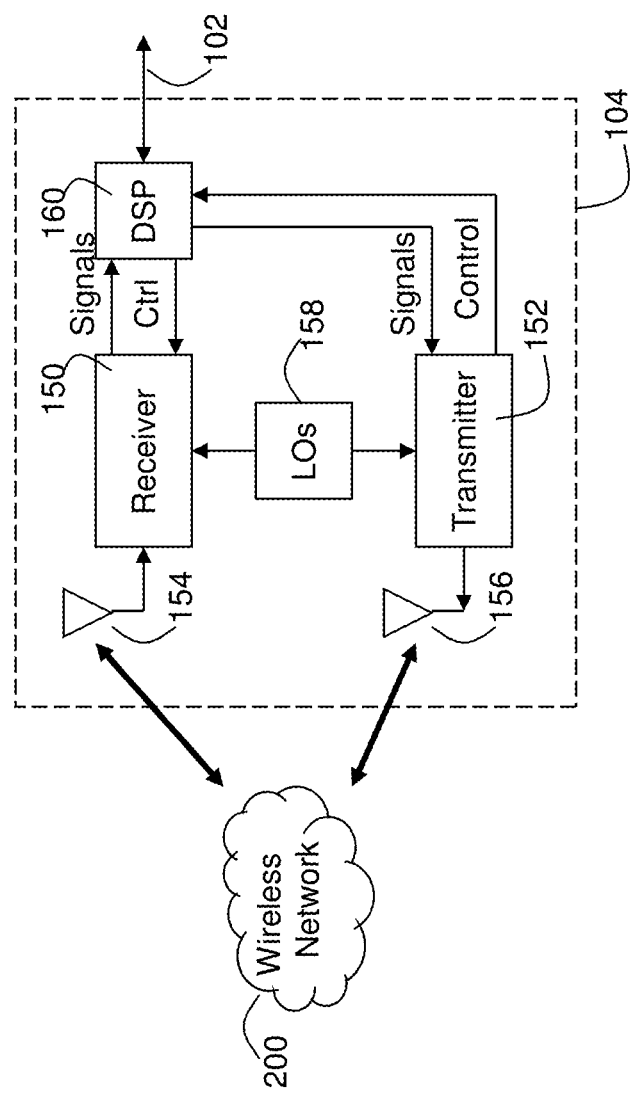
FIG. 5 is a block diagram of an example embodiment of a communication subsystem component of the mobile device of FIG. 4.

Referring now to FIG. 5, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 5 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 10 and the wireless network 20 can contain one or more different channels, typically different RF channels, and associated protocols used between the mobile device 10 and the wireless network 20. An RF channel is a limited resource that must be conserved, typically due to limits in overall bandwidth and limited battery power of the mobile device 10.

When the mobile device 10 is fully operational, the transmitter 152 is typically keyed or turned on only when it is transmitting to the wireless network 20 and is otherwise turned off to conserve resources. Similarly, the receiver 150 may be periodically turned off to conserve power until it is needed to receive signals or information (if at all) during designated time periods.

Figure 6:
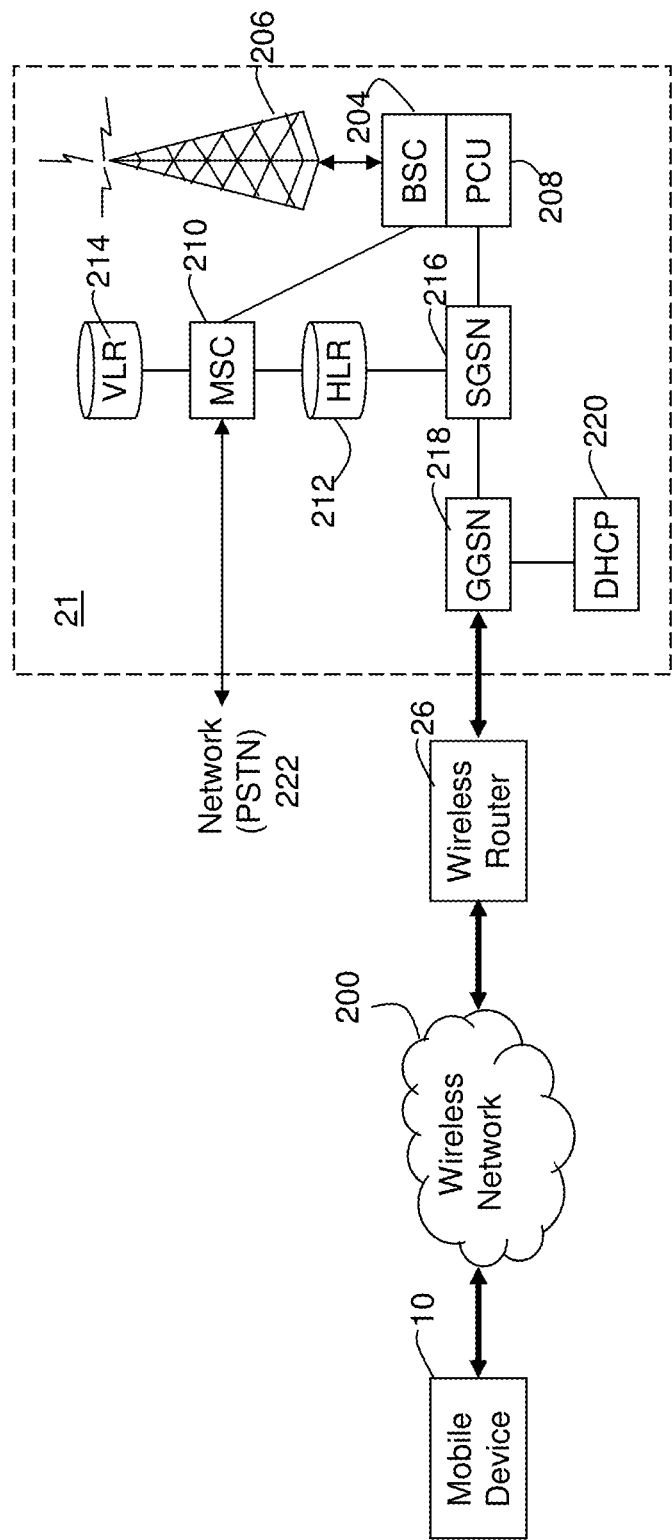
FIG. 6 is an example block diagram of a node of the wireless network shown in FIG. 3.

Referring now to FIG. 6, a block diagram of an example implementation of a node 21 of the wireless network 20 is shown. In practice, the wireless network 20 comprises one or more nodes 21. In conjunction with the connect module 144, the mobile device 10 can communicate with the node 21 within the wireless network 20. In the example implementation of FIG. 6, the node 21 is configured in accordance with GPRS and GSM technologies however the principles may equally be applied to other technologies such as CDMA and future 3G and 4G technologies. The node 21 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 21 within a GSM/GPRS network, but rather a list of components that are commonly used in communications through the network 20.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 10 and availability for both circuit switched and packet switched management, the HLR 212 is shared between the MSC 210 and the SGSN 216. Access to the VLR 214 is controlled by the MSC 210. This allows location information to be provided to the mobile device 10, e.g. for determining the coarse measurement of location described above.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 10 in accordance with particular, usually predetermined, communication protocols and parameters, under control of its controller. The fixed transceiver equipment similarly demodulates and possibly decodes and decrypts, if necessary, any communication signals received from the mobile device 10 within its cell. Communication protocols and parameters may vary between different nodes. For example, one node may employ a different modulation scheme and operate at different frequencies than other nodes.

For all mobile devices 10 registered with a specific network, permanent configuration data such as a user profile is stored in the HLR 212. The HLR 212 also contains location information for each registered mobile device 10 and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 20 by keeping track of the location of each mobile device 10. The SGSN 216 also performs security functions and access control for data traffic on the wireless network 20. The GGSN 218 provides internetworking connections with external packet switched networks and connects to one or more SGSN's 216 via an Internet Protocol (IP) backbone network operated within the network 20. During normal operations, a given mobile device 10 performs a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 10, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 20, insofar as each mobile device 10 must be assigned to one or more APNs and mobile devices 10 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 20. To maximize use of the PDP Contexts, the network 20 will run an idle timer for each PDP Context to determine if there is a lack of activity. When a mobile device 10 is not using its PDP Context, the PDP Context can be de-allocated and the IP address returned to the IP address pool managed by the DHCP server 220.

It will be appreciated that the components shown in FIG. 6 provide only one example of how to determine a mobile device's location through a cellular network and any other suitable method can be used with the principle described herein.

Figure 7:
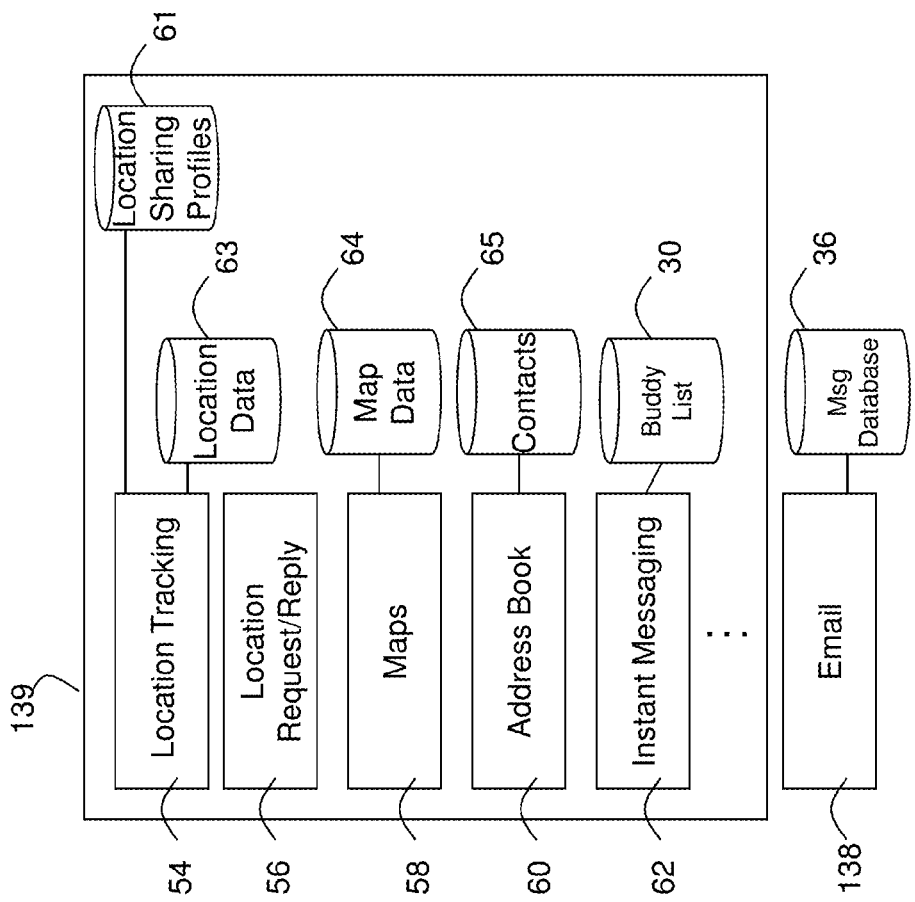
FIG. 7 is a block diagram illustrating example ones of the other software applications and components shown in FIG. 2.

FIG. 7 shows an example of the other software applications and components 139 that may be stored on and used with the mobile device 10. Only examples are shown in FIG. 7 and such examples are not to be considered exhaustive. In this example, a location tracking module 54, location request/reply module 56, maps application 58 and associated map data 64, address book 60, and an instant messaging application 62 and associated buddy list 30, are shown to illustrate some of the various features that may be provided by the mobile device 10. It may be noted that "application" and "module" may be used interchangeably or to refer to different data structures for the same feature. For example, a "module" may run behind the scenes like a daemon, whereas an "application" may provide a front-end UI for the user. It will however be appreciated that any combination of back-end and front-end functionality can be associated with a module, application, or combination thereof. Also shown in FIG. 7 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the email application 138 may use the address book 60 for contact details obtained from a list of contacts 65.

In this example, the location tracking module 54 is responsible for obtaining location information from both the GPS 18 and the wireless nodes 21 (e.g. using the mechanisms described above) and managing when to turn on the GPS receiver 121 and obtain the finer or higher resolution location information. The location tracking module 54 may also be used to compute a region of uncertainty based on a cellular tower location, however, this information may also be provided by a component of the wireless node 21 in other embodiments. The location tracking module 54 comprises or otherwise has access to location sharing profiles 61, which comprise user-specific preferences for sharing location information. The location sharing profiles 61 can be used to trigger automatic location sharing and the associated preferences should be changeable over time. The location tracking module 54 also comprises or otherwise has access to location data 63, which in this example is a data cache for storing location-specific data for other particular users, as well as current location information for the mobile device 10 on which it resides.

In this example, the location request/reply module 56 is responsible for enabling the user and the mobile device 10 (e.g. through prompt or automatic requests) to send a request for another user's current location and to process replies in order to update the information managed by the location tracking module 54. It will be appreciated that the location request/reply module 56 and the location tracking module 54 are shown as separate modules for illustrative purposes only and such modules 54, 56 could also be implemented in a single module or application.

It will be appreciated that any application or module exemplified herein may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 or accessible or connectable thereto. Any application or module herein described may be implemented using computer readable/executable instructions that may be stored or otherwise held by such computer readable media.

Figure 8:
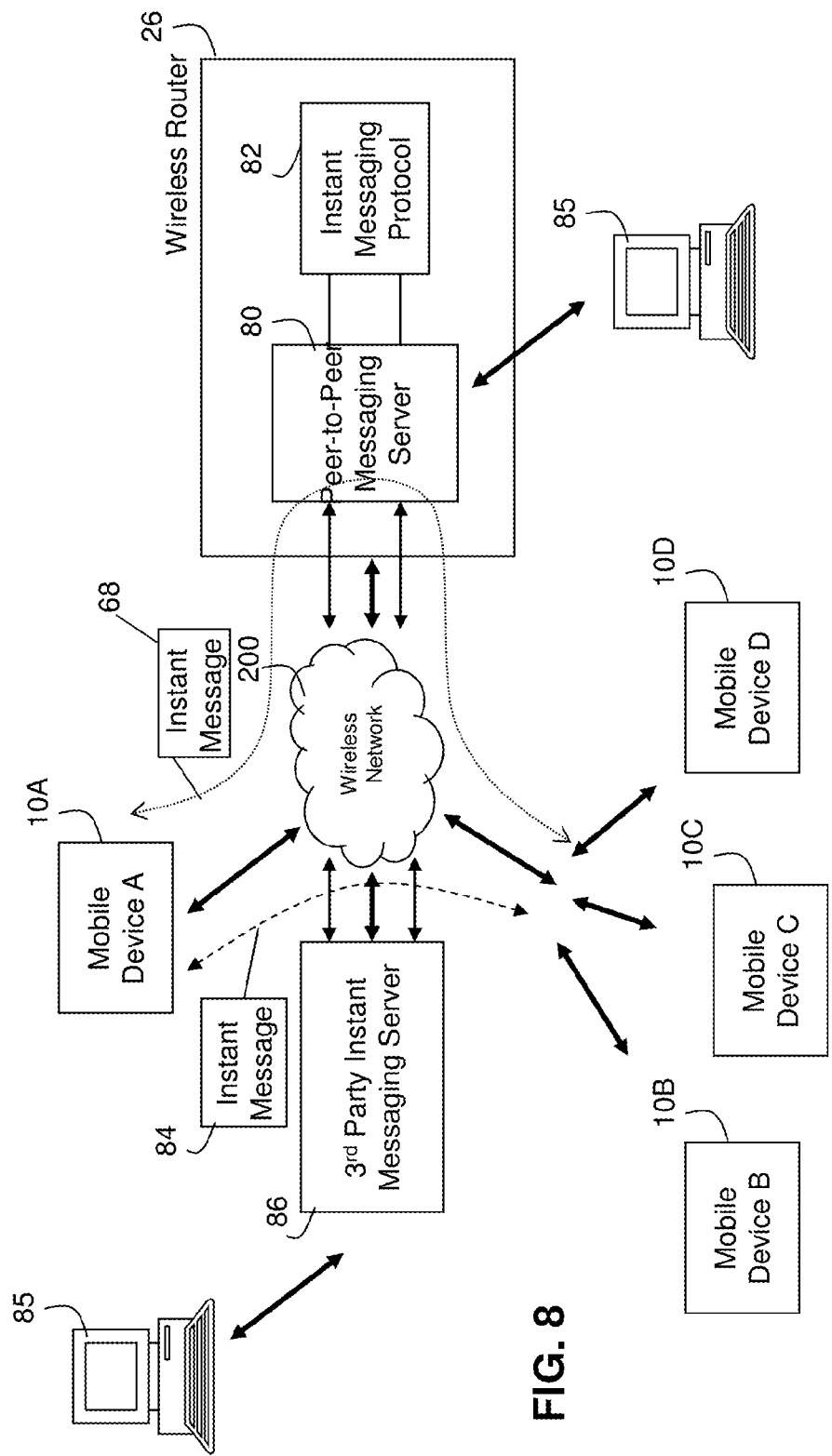
FIG. 8 is a system diagram showing one configuration for instant messaging on multiple platforms.

As discussed above, the exchange of location information is particularly useful in combination with IM capabilities. FIG. 8 illustrates a configuration suitable for a user of mobile device 10A, to conduct instant messaging with buddies included in their IM buddy list 30. It can be seen in FIG. 8 that two examples of instant messaging systems are shown. A host system IM service is shown that utilizes the wireless router 26 and a 3rd party instant messaging service is also shown that utilizes a 3rd party instant messaging server 86 accessed by mobile device 10A through the network 20. The host system IM service can be implemented in any suitable manner but for the sake of illustration, the following describes the host system IM service as being a personal identification number (PIN)-based messaging system. As can be seen, the 3rd party instant messaging server 86 may also communicate with desktop users 85 thus facilitating instant messaging between desktop users 85 and between a mobile device user 10 and a desktop user 85.

Similarly, the PIN-based messaging system may also facilitate communications with desktop users 85.

In the embodiment illustrated in FIG. 8, the PIN-based messaging system is implemented using a server-based communication infrastructure, such as one that provides email, SMS, voice, Internet and other communications. Particularly suitable for hosting a peer-to-peer messaging server 80, is the wireless router 26 used in systems such as those shown in FIG. 1. In FIG. 8, the wireless router 26 facilitates communications such as instant messaging between mobile device 10A and mobile devices for User B, User C and User D, denoted by 10B, 10C and 10D respectively. It will be appreciated that the number of users participating in the example shown in FIG. 8 is for illustrative purposes only. Instant messaging is provided by the instant messaging applications 50, 52 stored on each mobile device 10A-10D which can be initiated, for example, by highlighting and selecting a corresponding instant messaging icon from a display for the mobile device 10. In the host system IM service, the wireless router 26 routes messages between the mobile devices 10A-10D according to a PIN-to-PIN protocol 82.

A PIN-to-PIN based instant message is generally denoted by numeral 68 in FIG. 8 and may differ in structure from a $3^{rd}$ party based instant message 84. In a PIN-based messaging protocol 82, each message 68 has associated therewith a PIN corresponding to the mobile device 10 which has sent the message 68 (source) and includes a destination PIN identifying the intended recipient (destination). Although not shown in FIG. 8, each message 68 generally comprises a body, which contains the content for the message 68 (e.g. text), and a header, which contains various fields used for transmitting and processing each message 68. In this example, the header includes a message type field to specify the type of transmission (e.g. PIN, SMS etc.), a source field to specify the device address for the sender, a destination field to specify the device address for the intended recipient, a conversation ID field to identify which conversation thread the message 68 corresponds to (e.g. such that each message 68 is identified by the conversation in which it was sent), and a timestamp field to indicate the time (and if desired, the date) at which the message 68 was sent by the designated sender.

Although not shown in FIG. 8, one or more tags can also be used to indicate to the host system IM application 50, upon receipt of a message 68, that the message 68 has certain attributes such as a subject that is to be displayed, whether additional information is being transported (i.e. data or information in addition to the message content), or whether the message 68 is being used for some other purpose such as provisioning, synchronization, etc. In general, in a PIN based messaging protocol 82, the sender of the message 68 knows the PIN of the intended recipient. This is preferably established when the two devices request to add each other to their respective contact or buddy lists. At the time of requesting new contacts, in traditional PIN-to-PIN protocols 82, the two respective PIN numbers may be exchanged via request e-mails which are configured to be intercepted by the respective host system instant messaging applications 50 so as to not appear in the message list or "inbox" of the user.

It can be seen in the example shown in FIG. 8 that mobile device 10A can communicate directly with any of the mobile devices 10B-10D through the peer-to-peer messaging server 80 as indicated by the short-dashed line. Instant messaging can also be accomplished through the 3rd party IM server 86 by sending 3rd party based instant messages 84 over the wireless network 20 as indicated by the long-dashed line.

When conducting a PIN-to-PIN instant messaging session according to the embodiment shown in FIG. 8, the mobile devices 10A-10D can communicate directly with the wireless router 26 in a client based exchange where, similar to other peer-to-peer programs, an intermediate server is not required. A message 68 sent by one mobile device 10 is received by the wireless router 26, which obtains the PIN number for the intended recipient from information associated with the message (e.g. a data log) or from the message itself. Upon obtaining the recipient's PIN according to the PIN-to-PIN protocol 82, the wireless router 26 then routes the message 68 to the recipient associated with the mobile device 10 having such PIN. The wireless router 26 typically also provides a delivery confirmation to the original sender, which may or may not be displayed to the user. The destination device can also provide such delivery information. The wireless router 26 should be capable of routing messages 68 reliably and hold onto the messages 68 until they are successfully delivered. Alternatively, if delivery cannot be made after a certain timeout period, the wireless router 26 may provide a response indicating a failed delivery. The wireless router 26 may choose to expire a message 68 if a certain waiting period lapses.

It will also be appreciated that, as noted above, instant messaging can be implemented using any other suitable protocol such as SMS. In SMS, a message is transmitted to an SMC center (SMSC) within a carrier's infrastructure, and then delivered to the mobile phone number of the destination device. The SMSC would also be configured to hold onto messages and deliver then once the destination device is within coverage.

When conducting an instant messaging session using a 3rd party IM application, access to the 3rd party IM server 86 is first established and instant messages 84 exchanged over the wireless network 20 according to the appropriate protocol used by the 3rd party. It will be appreciated that the principles discussed below are equally applicable to both PIN-to-PIN messaging and other Internet service-based instant messaging systems hosted by such 3rd parties.

Figure 9:
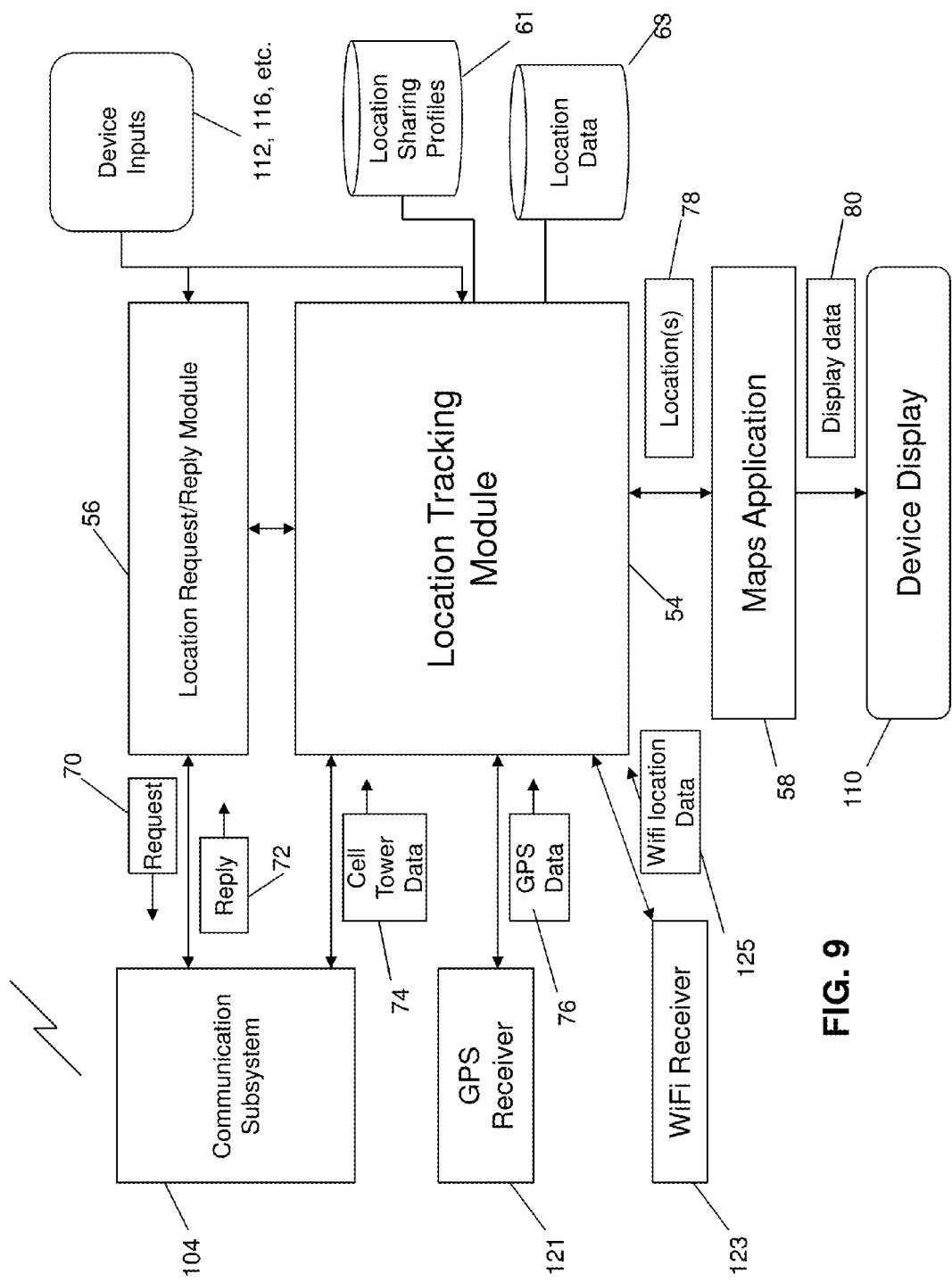
FIG. 9 is a block diagram illustrating an example configuration in a mobile device for utilizing the location tracking and location request/reply modules shown in FIG. 7.

Turning now to FIG. 9, an example block diagram is provided illustrating one configuration in the mobile device 10 for utilizing the location tracking module 54 and the location request/reply module 56. As illustrated in FIG. 9, the location tracking module 54 can access the GPS receiver 121, e.g. through the processor 102, to obtain GPS data 76 for the mobile device 10 on which it resides. Similarly, the location tracking module 54 can access the WiFi receiver 123 to obtain WiFi data 125, which may include more accurate location information, as provided through an location based service. Through the communication subsystem 104, the location tracking module 54 can also request location information from the wireless node 21, e.g. as described above with reference to FIG. 6, to obtain cell tower data 74 indicative of an approximate location for the mobile device 10. The location tracking module 54 can utilize both the cell tower data 74, WiFi data 125 and the GPS data 76 to generate location information 78 that is compatible with the maps application 58 to enable the maps application 58 to include display data 80 for showing a location for the mobile device 10 on the device display 110.

For clarification, although specific examples used herein may refer to GPS data 76 and the GPS receiver 121, WiFi data 125 and the WiFi receiver 123 may also be used (e.g. in the alternative) to determine location information. It may be advantageous, for example, to use WiFi-based location technology in indoor environments where GPS may not be available.

Continuing with FIG. 9, the location tracking module 54 may also process inputs from one or more device inputs 112, 116, etc. such as keystrokes, trackball movements, convenience key selections, stylus or touch-screen inputs, etc. Such inputs 112, 116, etc. may be associated with invoking menus, responding to prompts, changing location preferences or any other appropriate interaction with the user. It will be appreciated that the location tracking module 54, with the necessary permissions, can also use the communication subsystem 104 to obtain cell tower data 74 for other mobile devices 10. For example, if mobile device 10B is associated with a buddy of the user for mobile device 10A, mobile device 10A can request cell tower data 74 directly from the wireless node 21 instead of having mobile device 10B obtain such data and send it to mobile device 10A.

The location request/reply module 56 is also connectable to the wireless network 20 through the communication subsystem 104 in order to send a request 70 to another mobile device 10 to obtain their current location, and to receive a reply 72 with the current location. It can be appreciated that the request 70 and reply 72 can be made using any messaging medium but for the purpose of illustration, the embodiments described herein will utilize a PIN-to-PIN-based instant message 68 for delivery of location information that is requested by one mobile device 10 and returned by another mobile device 10. The request 70 and reply 72 can be used by the location tracking module 54 to obtain the desired location information for other mobile devices 10, e.g. by invoking the location request/reply module 56 at the appropriate time(s). Similar to the above, the location request/reply module 56 may also be invoked via device inputs 112, 116, etc. in order to initiate a request 70, detect selections associated with a prompt (not shown), detect selections associated with menu or preference selections, among other things.

Figure 10:
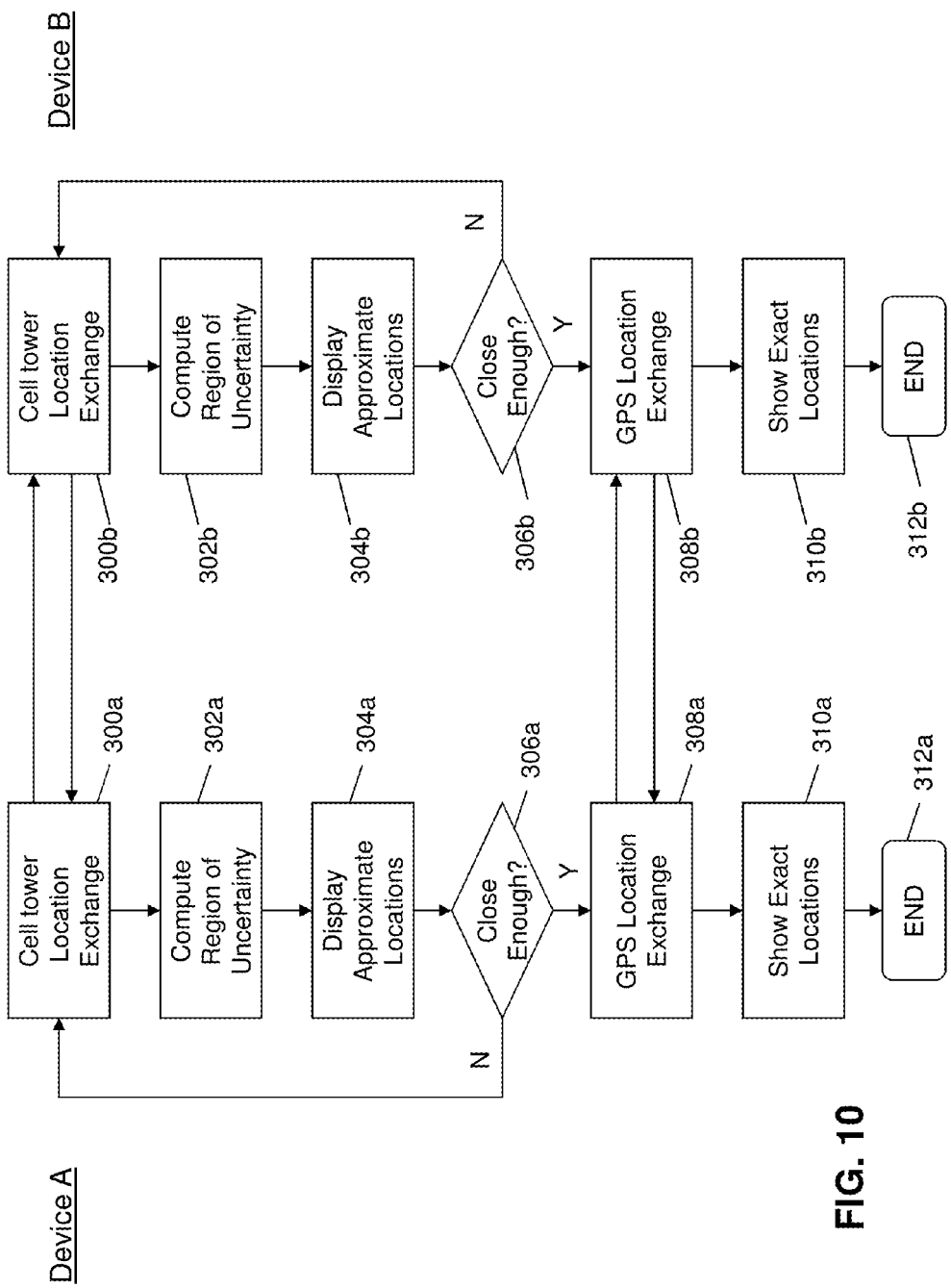
FIG. 10 is a flow chart illustrating example computer executable instructions for utilizing cell tower location until a predetermined proximity and using GPS location thereafter.

Turning now to FIG. 10, a set of example computer executable operations is shown for sharing and displaying location information for mobile devices 10. In this example, both mobile device 10A and mobile device 10B are associated with IM buddies and it is assumed that one of the users has initiated a location tracking process. At 300a and 300b, the respective mobile devices 10A, 10B participate in a cell tower location exchange. This can be done using a request/reply procedure as will be explained in greater detail below, or cell tower data 74 can be obtained directly from the wireless network 20. In this example, it is assumed that each mobile device 10 will compute a region of uncertainty at 302a, 302b, based on the cell tower data 74. However, it will be appreciated that in other embodiments, the region of uncertainty may already be included in the cell tower data 74, e.g. if the respective devices have already computed this for themselves. It will also be appreciated that the associated regions of uncertainty, or more generally, the approximate locations of the mobile device 10 may be determined using manual input from the user (e.g. inputting city, nearest intersection, zip code, postal code, etc.) or from other location approximation technologies (e.g. WiMAX).

Figure 13B:
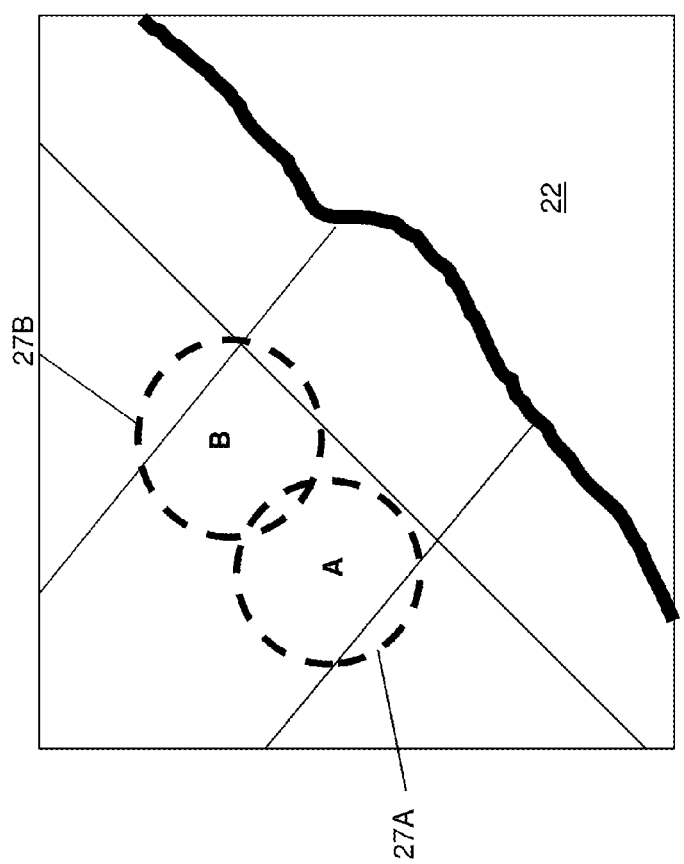
FIG. 13(b) is another screen shot of an example GUI for a maps application showing a region of uncertainty for each of a pair of mobile devices derived from cell tower location information when such devices are closer to each other.

With the associated regions of uncertainty computed, the respective mobile devices 10A, 10B can display approximate locations 27A, 27B at 304a, e.g. as shown in FIG. 13(a). As can be seen in FIG. 13(a), the map 22 is zoomed accordingly such that both regions of uncertainty (or approximate locations) 27A, 27B can be seen on the same map 22. Turning back to FIG. 10, the location tracking module 54 may then determine at 306a, 306b, whether or not the mobile devices 10A, 10B are "close enough". This determination can be made on any suitable criteria. For example, the mobile devices 10A, 10B may be considered "close enough" if the regions of uncertainty 27A, 27B intersect, as shown in FIG. 13(b). Alternatively, any other relative-distance related criterion can be used. For example, the outer boundaries of the regions of uncertainty can be measured and locations along those boundaries compared such that if a portion of each boundary is within a predetermined distance, the mobile devices 10A, 10B can be considered "close enough".

Figure 13C:
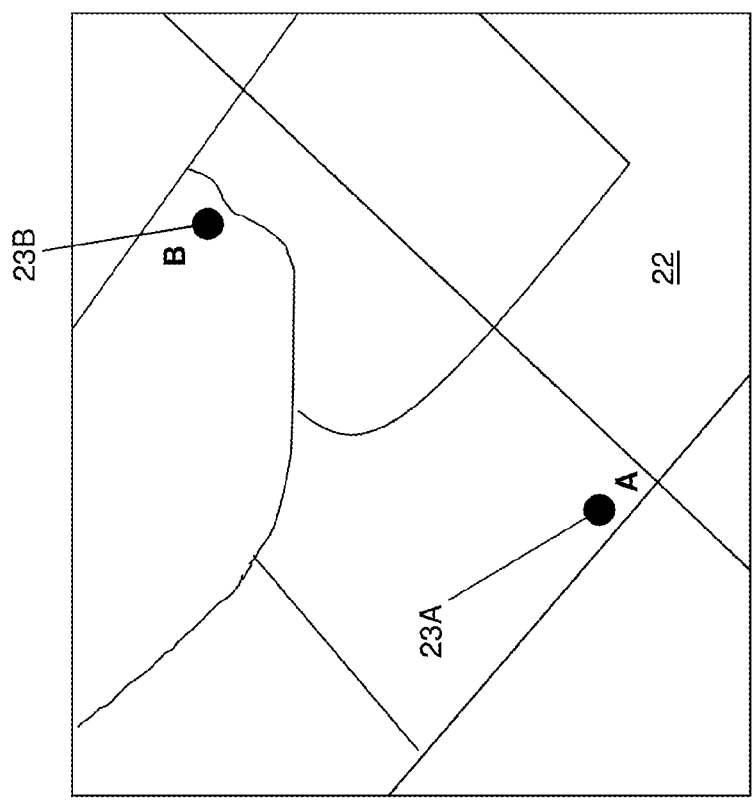
FIG. 13(c) is yet another screen shot of an example GUI for a maps application showing a GPS location for each mobile device upon detecting a predetermined proximity with respect to the regions of uncertainty.

Once it is determined at 306a, 306b that the mobile devices 10A, 10B are close enough, the mobile devices 10A, 10B can participate in an exchange of GPS data 76 at 308a, 308b. It will be appreciated that if the mobile devices 10A, 10B are not closely synchronized or utilize different criteria for determining whether the mobile devices 10A, 10B are close enough, a first one of the mobile devices 10A, 10B may initiate the exchange 308a, 308b to thereafter synchronize the location tracking on each of the mobile devices 10A, 10B. Once the mobile devices 10A, 10B have GPS data 76 for each other, they may show the "exact" locations 23A and 23B at 310a, e.g. as shown in FIG. 13(c). It can be seen in FIG. 13(c) that once the finer location details or higher resolution location details are known by way of the GPS data 76 the map 22 can be zoomed in closer to show more accurate directions and distances between the mobile devices 10A, 10B.

It will be appreciated that the principles shown in FIG. 10 can be extended to more than two buddies and thus any group of mobile devices 10 can also be tracked.

It will also be appreciated that the principles shown in FIG. 10 may be generally applied to a mobile device 10 trying to reach a desired destination, such as for example a stationary destination. A mobile device 10 may compute its region of uncertainty using cell tower information. If the mobile device's approximate location is close enough to the desired destination, the GPS receiver 121 is activated to provide the exact location of the mobile device 10. This higher resolution location information may be used by the mobile device 10 to direct the user to the desired location.

Turning now to FIG. 11, a set of example computer executable operations is shown for performing a request/reply procedure, e.g. using the location request/reply module 56. The procedure shown in FIG. 11 can be performed in connection with the location tracking shown in FIG. 10, or may be performed individually, e.g. to request a location during an IM conversation or at any other desired time. In this example, it is assumed that mobile device 10A initiates the request/reply procedure. At 320, the mobile device 10A detects selection of a request location option. In some embodiments, the location request/reply module 56 may be configured to utilize, if applicable, user preferences regarding pre-approval to share location information for the mobile device 10A on which it resides. This would be done at operation 322. Upon the request location option being invoked, a location request is prepared and sent at 324. If the mobile device 10A also has permission to send its own location information, it may gather already stored or may obtain cell tower data 74, GPS data 76 or both, and append this data at 326. As noted above, the location request 70 can take the form of a PIN-to-PIN based instant message 68 with the payload comprising the location information. At 328 the mobile device 10B receives the location request 70 and, if the location information for mobile device 10A is appended, it may be saved by mobile device 10B at 330.

In this example, it is assumed that the location request 70 is the first being made by mobile device 10A and there are no pre-existing permissions for mobile device 10B to automatically share its location. On this assumption, the location request/reply module 56 may have the location tracking module 54 (or may itself) generate and display a prompt regarding the request at 332. The prompt may include an option to automatically share its location information with User A and mobile device 10A. If the user selects this option, the mobile device 10B determines at 334 that mobile device A should be added to an "automatic replies" list stored in the location sharing profiles 61 at 336. In either case, if the user allows the location information to be shared, the mobile device 10B then determines its current location at 338. This can be done using the location tracking module 54 in real time or can rely on stored or cached location information if appropriate. The mobile device 10B then sends a reply 72 at 340 which include its current location. It can be appreciated that the request 70 may be directed to cell tower data 74, GPS data 76 or both and thus the mobile device 10B would obtain the requested information accordingly.

The mobile device 10A then receives the reply at 342 and can use this information to display location data 78 in the maps application, to indicate a location in an IM conversation, or in any other suitable manner. As shown in the dashed lines in FIG. 11, the request/reply procedure may be configured to be a two way location sharing procedure and, if the mobile device 10A had not already shared its current location at 326, it may then prompt the user about sharing their location 344 in exchange for the reply 72 received at 342. This situation may occur where user A first wishes to find out where user B is location wise and during this exchange they decide to meet up and track each other's locations. In this case, user A would also need to share their location information, e.g. as shown in FIG. 10. Based on the prompt at 344, the mobile device 10A determines at 346 whether or not user A wishes to share their location information. If not, the procedure ends at 348. If so, the mobile device 10A can determine their current location, e.g. cell tower data 74 or GPS data 76 in this example, and sends this information to the mobile device 10B at 350 such that they can receive, save, display etc. the location information for mobile device 10A at 352.

In may also be appreciated that it may be desirable to control how often cell tower data 74 is exchanged between mobile devices 10, or how often the region of uncertainty of a mobile device 10 is determined, or both. In this way, a mobile device's computing and data resources may be reduced. The frequency of controlling the exchange of the cell tower data 74 between mobile devices 10, or the frequency of determining the region of uncertainty of a mobile device 10, may be manually determined by a user. For example, the mobile device 10 may receive frequency settings to carry out the above actions once every predetermined time period.

Figure 12D:
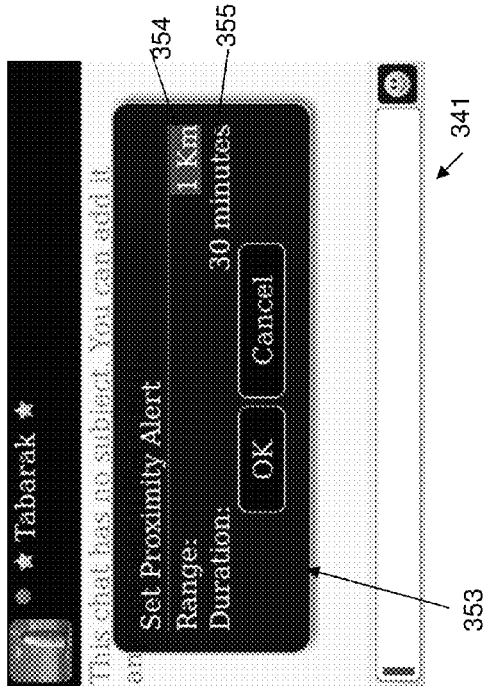
FIG. 12(d) is a screen shot of another example GUI for setting a proximity alert to be sent to a user.
Figure 12C:
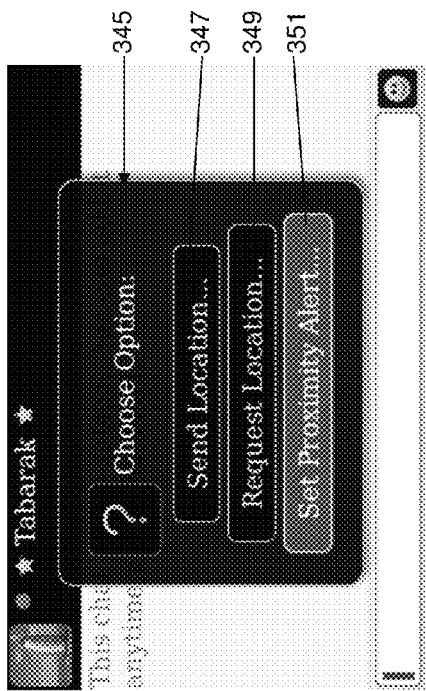
FIG. 12(c) is a screen shot of another example GUI for selecting the different ways of sharing location information, with the option to set a proximity alert being highlighted.
Figure 12E:
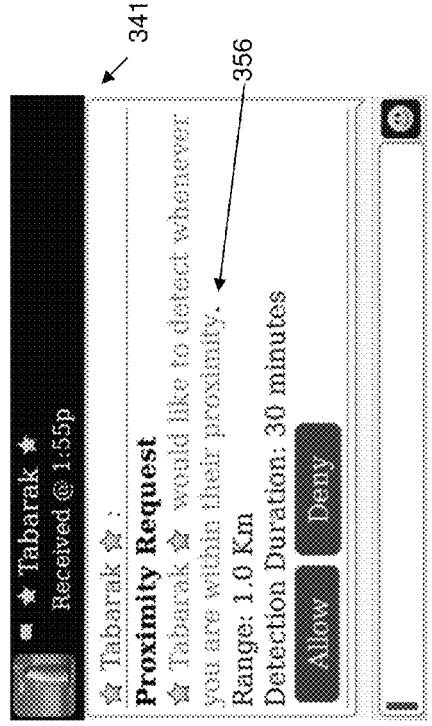
FIG. 12(e) is a screen shot of another example GUI for receiving a request from a user to set-up a proximity alert.

FIGS. 12 (*a*), (*b*), (*c*), (*d*) and (*e*) provide a number of example screen shots for sharing location information with another user. Turning to FIG. 12(*a*), a conversation window 341 is provided between a user and the contact named "Tabarak". A menu 343 is also displayed, which includes the option of "location sharing". If this option is selected, the option GUI 345 in FIG. 12(*b*) appears. In particular, the options include: sending location information to the contact (347), requesting location information from the contact (349), and setting a proximity alert between the user and the contact (351). It can be understood that, selecting option 347 would send location information to the contact, and selection option 349 would request location information from the contact.

Turning to FIG. 12(*c*), the user may select option 351. If so, in FIG. 12(*d*), the "Set Proximity Alert" GUI 353 is displayed. The GUI 353 may include options to determine the range (e.g. distance) 354 and the duration (e.g. length of time) 355 that proximity alert is activated. For example, if the range is set to 1 km and the duration is set to 30 minutes, then over the next 30 minutes, if the user and the contact come within a distance of 1 km or less from each other, then an alert is sent to both the user and the contact. Turning to FIG. 12(*e*), if such a proximity alert is initiated by the contact, then the user will receive a proximity request 356 from the contact. For example, the user's mobile device may received a request from the contact, which may read "The contact would like to detect whenever you are within their proximity." The user may have the option to allow or deny the application.

Figure 14B:
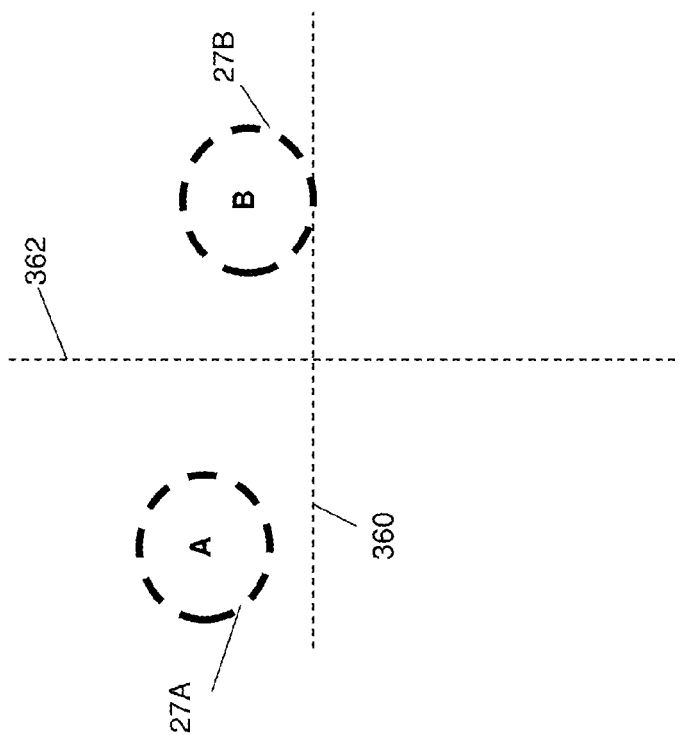
FIG. 14(b) is a schematic diagram of an example embodiment of the horizontal line and the vertical line in FIG. 14(a) with the regions of uncertainty in a different configuration.
Figure 14A:
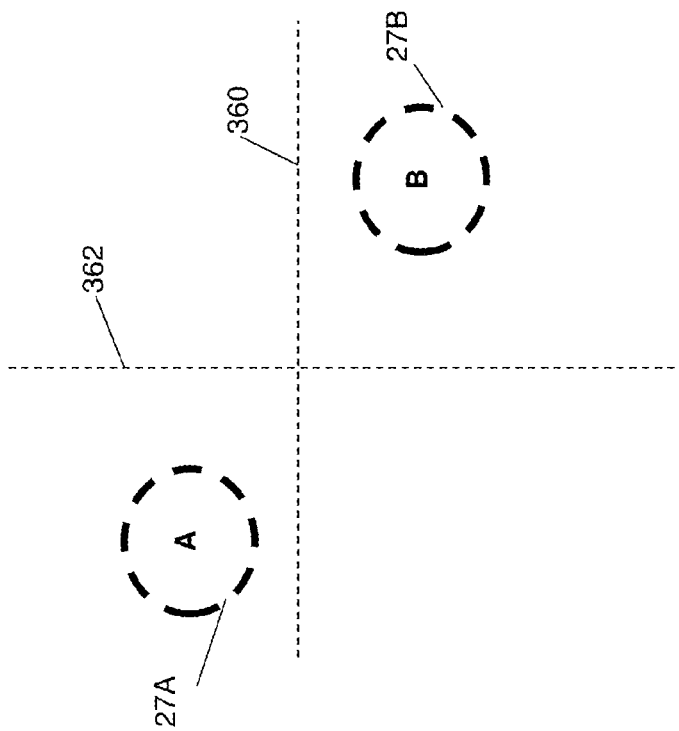
FIG. 14(a) is a schematic diagram of an example embodiment of a horizontal line and a vertical line positioned between the regions of uncertainty of a pair of mobile devices.

The frequency may also be controlled by establishing pre-determined criteria, for example, based on the distance between the approximate locations of the mobile devices 10. Turning to FIG. 14(*a*), the initial approximate location 27A of mobile device 10A and the initial approximate location 27B of mobile device 10B are shown. On one or both of the mobile devices 10A, 10B, a vertical line 362 and a horizontal line 360 are generated and positioned between the approximate locations 27A and 27B. The lines 360, 362 may be generated to mark and separate different areas or regions between the mobile devices 10*a*, 10*b*. Turning to FIG. 14(*b*), if for example, on mobile device 10B, the horizontal line 360 and vertical line 362 are generated, then, if mobile device 10B's approximate location 27B touches, overlaps, or crosses over either one of the lines 360, 362, then the updated cell tower data 74 is exchanged with mobile device 10A. More generally, if a mobile device 10 has moved away from its initial approximate location to a predetermined area, then the mobile device 10 may exchange cell tower data 74 with another mobile device 10. This reduces the frequency of data exchanges between mobile devices 10, thereby reducing the computing and data resources used by a mobile device 10.

In one example embodiment, the horizontal line 260 may be placed vertically equidistant between the regions of uncertainty of each mobile device 10*a*, 10*b*. Similarly, the vertical line 262 may be placed horizontally equidistant between the regions of uncertainty of each mobile device 10*a*, 10*b*. More generally, the lines 260, 262 may be placed in various positions between the regions of uncertainty, or the approximate locations 27A, 27B. It can be appreciated, that either the horizontal line 260 or the vertical line 262 may be used, or both. In another embodiment, the width of the lines 360, 362 may also be variable. For example, the width of the lines 360, 362 may be determined based on the distance between the approximate locations 27A, 27B. In one example embodiment, the further the distance between the approximate locations 27A, 27B, the wider the width of a line 360, 362.

Figure 15B:
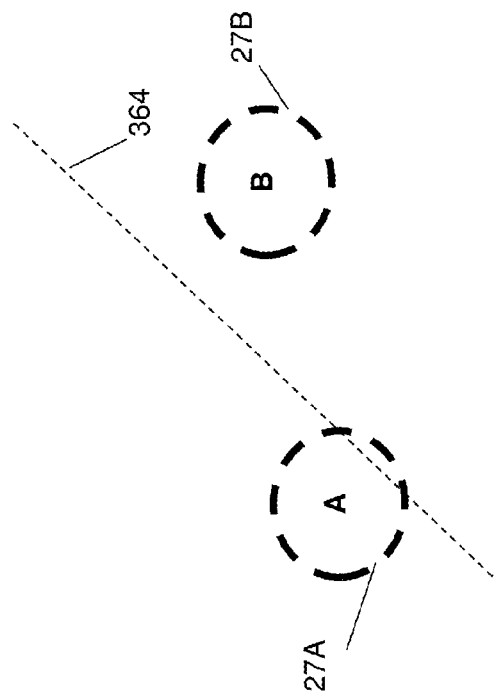
FIG. 15(b) is a schematic diagram of an example embodiment of the single line in FIG. 15(a) with the regions of uncertainty in a different configuration.
Figure 15A:
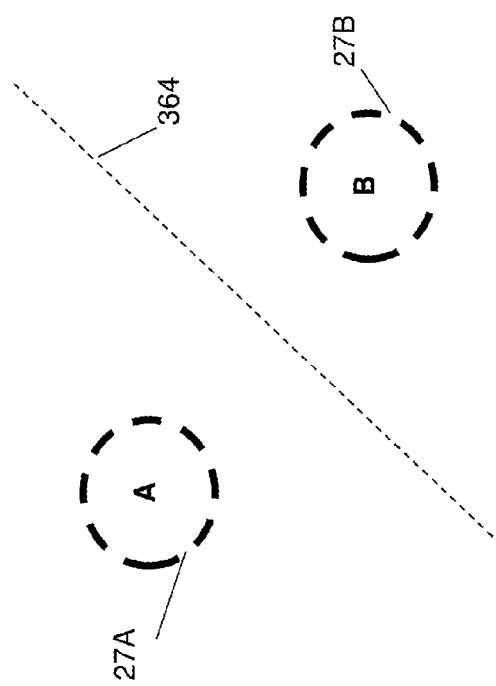
FIG. 15(a) is a schematic diagram of an example embodiment of a single line between the regions of uncertainty of a pair of mobile devices.

Turning to FIG. 15(*a*), in another example embodiment, a single line 364 may be positioned between the approximate location 27A of mobile device 10A and the approximate location 27B of mobile device 10B. It can be seen that the single line 364 may be angled to be account for the vertical and horizontal distances between the approximate locations 27A, 27B. For example, a line representing the shortest distance between the approximate locations 27A, 27B may be determined, and a single line 364 may be established to perpendicularly bisect the line. Turning to FIG. 15(*b*), if mobile device 10A detects that its approximate location 27A has touched or overlapped or crossed-over the single line 364, then mobile device 10A may exchange the cell tower data 74 with mobile device 10b. Thus, the updated whereabouts of the mobile devices 10a, 10b are made known to one another when the mobile devices 10a, 10b are located in certain pre-determined areas or regions.

It can also be appreciated that the lines (e.g. 360, 362, 364) may also be used as a threshold to activate the GPS on a mobile device. For example, if an approximate location 27 of a mobile device 10 touches, overlaps or crosses-over a line, then the mobile device's GPS receiver 121 is activated.

Figure 16:
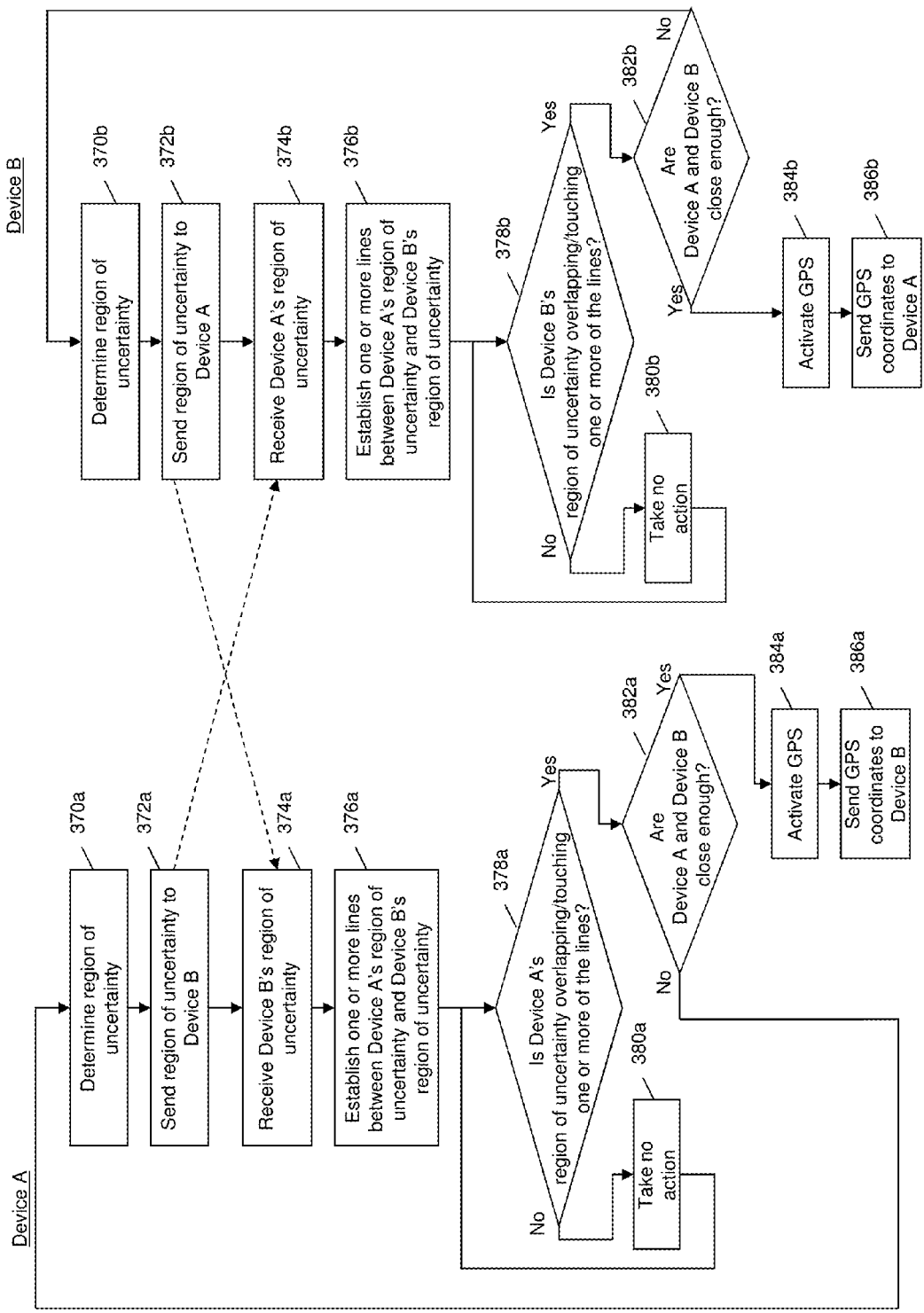
FIG. 16 is a flow chart illustrating example computer executable instructions for a mobile device establishing one or more lines between its region of uncertainty and another mobile device's region of uncertainty.

A set of example computer executable operations related to the lines (e.g. 360, 362, 364) is shown in FIG. 16. At 370a, 370b, mobile devices 10a, 10b each determine their region of uncertainty. At 372a, mobile device 10a sends its region of uncertainty to mobile device 10b. Similarly, at 372b, mobile device 10b sends its region of uncertainty to mobile device 10a. At 374a, 374b, the mobile devices 10a, 10b receive the other's region of uncertainty. Although not shown, in another embodiment, mobile device 10a may exchange its cell tower data 74 with mobile device 10b to enable the mobile device 10b to compute the region of uncertainty for mobile device 10a.

Upon each mobile device 10a, 10b having received or computed the regions of uncertainty, at 376a, 376b, each mobile device 10a, 10b computes or establishes one or more lines between its own region of uncertainty and the other mobile device's region of uncertainty. For example, at 376a, mobile device 10a establishes one or more lines between its region of uncertainty and mobile device B's region of uncertainty.

For clarity of understanding, the operations at mobile device 10a are discussed in detail, and that such operations similarly occur at mobile device 10b. Mobile device 10a determines whether or not its region of uncertainty is touching, overlapping or has crossed over the one or more lines (378a). If not, no action is taken (380a) and the condition at 378a is monitored. At 378a, if it is determined that mobile device 10a's region of uncertainty is touching, overlapping or has crossed over the one or more lines, then at 382a, it is determined whether or not mobile device 10a and mobile device 10b are close enough. If not, then the updated cell tower data 74 or the updated regions of uncertainty are exchanged again between the mobile devices 10a,10b (e.g. 370a, 370b, 372a, 372b, 374a, 374b) and a new or updated set of one or more lines are established (e.g. 376a, 376b). However, if the mobile devices 10a, 10b are close enough, then the GPS receiver 121 is activated (384a), and mobile device 10a sends the GPS data 76 to mobile device 10b (386a).

It can be appreciated that similar operations may occur on mobile device 10b, as shown with respect to 378b, 380b, 382b, 384b, and 386b.

Figure 17:
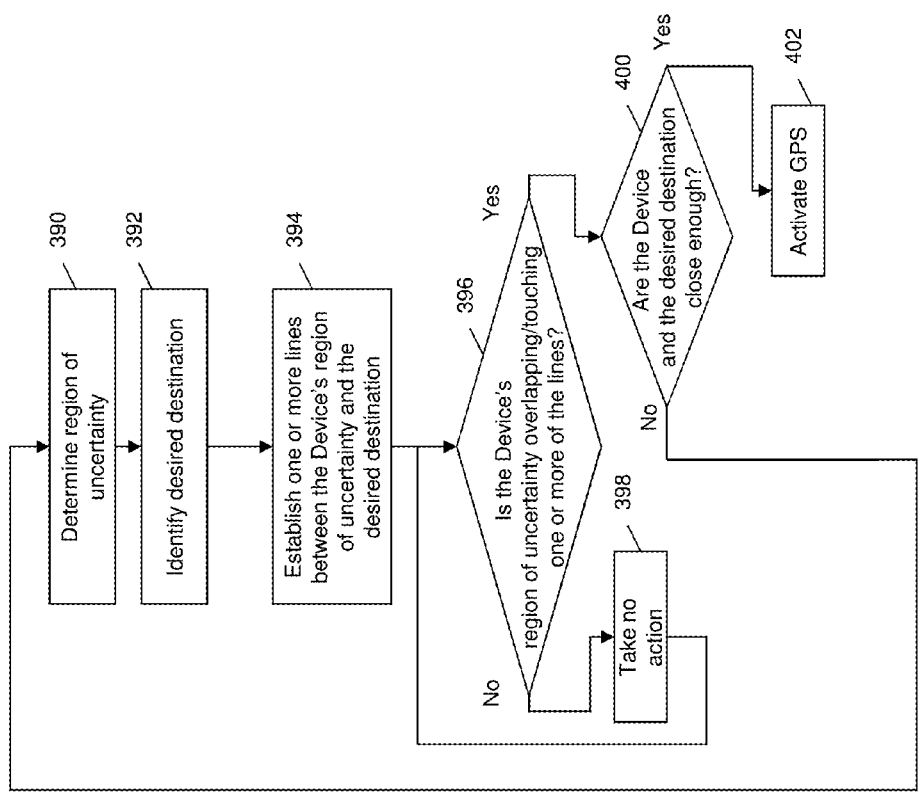
FIG. 17 is a flow chart illustrating example computer executable instructions for a mobile device establishing one or more lines between its region of uncertainty and a desired location.

Turning to FIG. 17, a set of computer executable operations is provided for locating a mobile device 10 relative to a desired destination. At 390, the mobile device 10 determines its region of uncertainty and then, at 392, identifies the location of the desired destination. At 394, the mobile device 10 then computes or establishes one or more lines between its region of uncertainty and the location of the desired destination. At 396, the mobile device 10 determines if its region of uncertainty is touching, overlapping or has crossed over the one or more lines. If not, not action is taken (398) and the condition at 396 continues to be monitored. If so, at 400, the mobile device 10 determines whether or not the approximate location of the mobile device 10 and the desired destination are close enough. If not, a new set of one or more lines is established. Otherwise, if the mobile device 10 is close enough, then the GPS receiver 121 on the mobile device 10 is activated.

More generally, upon determining the approximate location of a mobile device 10 and a desired location (e.g. location of another mobile device), one or more lines may be established between the approximate location and the desired location. Therefore, if the approximate location is within a predetermined distance from the desired location, whereby the predetermined distance may comprise the distance between any one of the one or more lines to the desired location, then the GPS receiver 121 or the WIFI receiver 123 may be activated. For example, upon detecting that the approximate location of the mobile device 10 coincides with the one or more lines, then the GPS receiver 121 or the WIFI receiver 123 is activated. As described above, mobile device 10a may send its approximate location to another mobile device 10b upon detecting its approximate location coincides with one or more of the lines.

Figure 18:
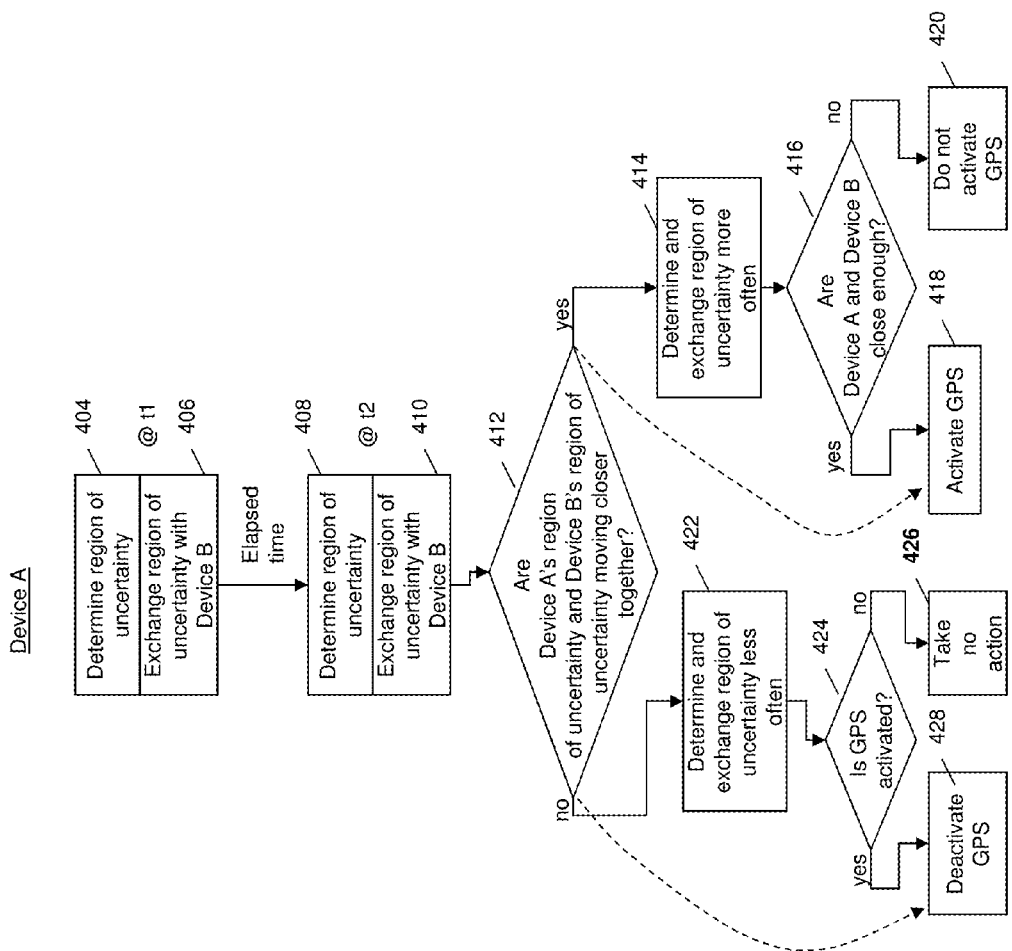
FIG. 18 is a flow chart illustrating example computer executable instructions for a mobile device determining whether or not it is moving closer to another mobile device.

FIG. 18 shows a set of computer executable operations for determining the region of uncertainty, or activating or deactivating the GPS receiver 121 based on whether mobile devices 10a, 10b are moving away from one another or towards one another. At 404, mobile device 10a determines the region of uncertainty and, at 406, exchanges its region of uncertainty with mobile device 10b. This may occur at a first time, for example at t1. After some elapsed time, mobile device 10a may determine its region uncertainty again (408) and exchange its region of uncertainty again with mobile device 10b (410). Operations 408, 410 may occur at another time, for example at t2. At 412, mobile device 10a determines if its region of uncertainty and mobile device 10b's region of uncertainty are moving closer together or further apart over the elapsed time. If the mobile devices 10a, 10b are moving closer together, then at 414, the mobile devices 10a, 10b determine and exchange their regions of uncertainty more often between one another. If the mobile devices 10a, 10b continue to move closer to one another, until they are close enough (416), the GPS receiver 121 is activated (418). However, if the mobile devices 10a, 10b are not close enough, then at 420, the GPS receiver 121 is not activated. Alternatively, as shown by the dotted arrow line, if, at 412, mobile device 10a determines that the mobile devices 10a, 10b are moving closer together, then mobile device 10a may activate the GPS receiver 121, as per 418. Thus, operations 414 and 416 may be by-passed.

If, at 412, mobile device 10a determines that the mobile devices 10a, 10b are moving further away from one another, then at 422, the mobile device 10a determines and exchanges its region of uncertainty less often with mobile device 10b. In addition, if the GPS receiver 121 is activated (424), then it is then deactivated (428). If it is not activated, then no action is taken at 426. Alternatively, as shown by the dotted arrow line, if at 412, mobile device 10 determines that the mobile devices 10a, 10b are moving further away from one another, then the GPS receiver 121 is deactivated (428), therefore by-passing operations 422 and 424.

Figure 19:
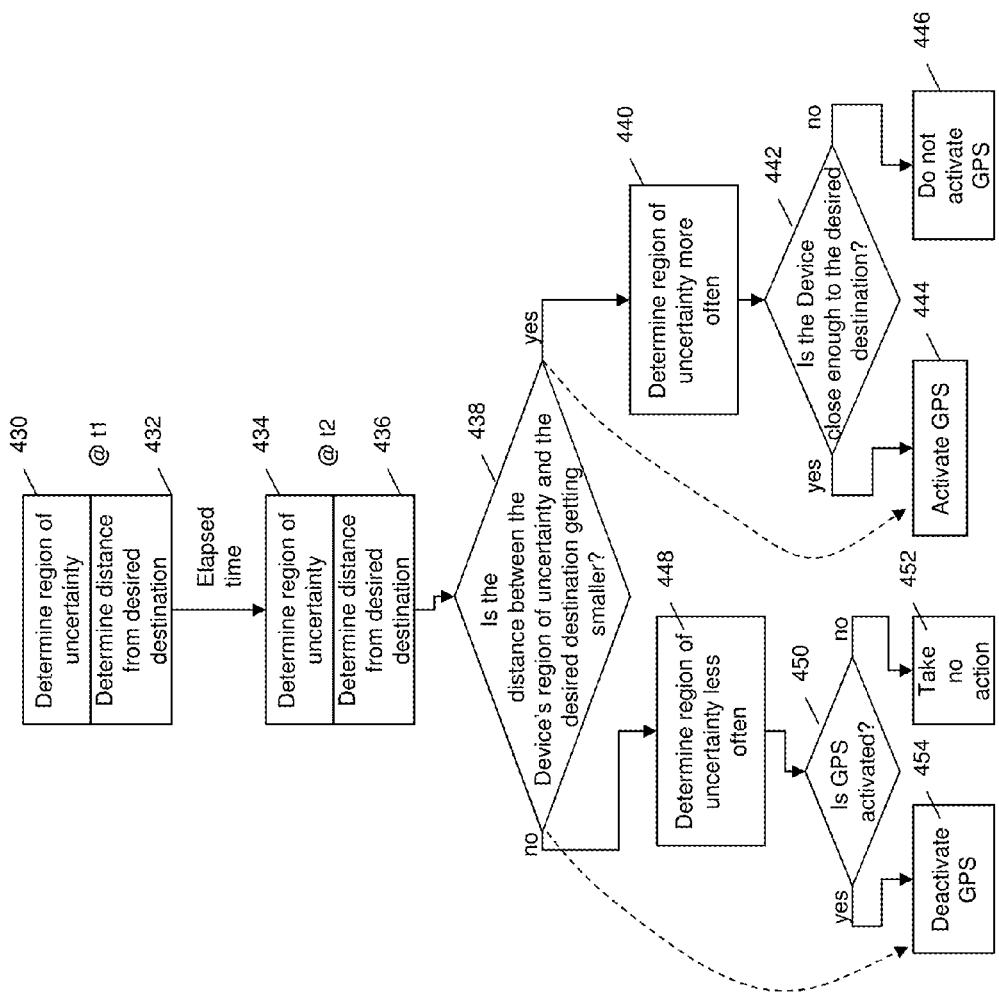
FIG. 19 is a flow chart illustrating example computer executable instructions for a mobile device determining whether or not it is moving closer to a desired location.

Turning to FIG. 19, another set of computer executable operations is provided for determining the region of uncertainty, or activating or deactivating the GPS receiver 121 based on whether a mobile device 10 is moving closer or further away from a desired destination. At some initial time (e.g. at t1), the mobile device 10 determines its region of uncertainty (430), as well as the approximate distance between itself and the location of the desired destination (432). After some elapsed time (e.g. at t2), again the mobile device 10 determines its region of uncertainty (434), as well as the approximate distance between itself and the location of the desired destination (436). At 438, if the distance between the mobile device's region of uncertainty and the location of the desired destination is getting smaller (e.g. they are getting closer together), then, at 440, the mobile device 10 determines the region of uncertainty more often. As the mobile device 10 gets closer to the desired destination, at 442, the mobile device 10 will determine whether its approximate location is close enough to the desired destination. If so, at 444, the GPS receiver 121 is activated. If not, at 446, the GPS receiver 121 is not activated. Alternatively, as shown by the dotted arrow line, the GPS receiver 121 may be activated upon determining the mobile device 10 is moving closer to the desired destination.

However, if, at 438, it is determined that the mobile device 10 is moving further away from the desired destination, then at 448, the mobile device 10 determines the region of uncertainty less often. Further, if the GPS receiver 121 is activated (450), then it may be deactivated (454), or else no action may be taken (452). Alternatively, as shown by the dotted arrow line, the GPS receiver 121 may be deactivated upon determining that the mobile device 10 is moving further away from the desired destination.

It can be appreciated that there are different approaches for determining when to activate and deactivate the GPS receiver 121 based on whether a mobile device is close enough. It can also be appreciated that there are different approaches for determining when and how often the region of uncertainty is determined and exchanged. For example, upon determining that the approximate location of the mobile device 10 is moving closer to the desired location within a time period, then the frequency at which the approximate location is determined is increased.

In an example embodiment, a method and a system are provided to determine a region of uncertainty or an approximate location of a mobile device; determine whether or not the region of uncertainty or the approximate location is close enough to another mobile device or a desired destination; and then, if close enough, activating the GPS receiver 121 or WiFi receiver 123 to determine a more accurate location.

More generally, any method or system that controls the use of a location measurement system on a mobile device by obtaining a first location measurement pertaining to the mobile device is applicable to the principles described herein. Further, if the first location measurement is within a predetermined distance from a desired location, initiating use of the location measurement system to obtain a second location measurement.

The steps or operations in the flow charts described herein are just for example. There may be many variations to these steps or operations without departing from the principles described herein. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A method, by a first mobile device, for controlling use of a location measurement system on the first mobile device, the method comprising:
   obtaining a region of uncertainty of the first mobile device using an other location measurement system or manually inputted data;
   receiving data for a region of uncertainty of a second mobile device;
   displaying a map of both regions of uncertainty of the first mobile device and the second mobile device;
   computing at least one line that bisects at least one of a horizontal distance and a vertical distance between the region of uncertainty of the first mobile device and the region of uncertainty of the second mobile device;
   obtaining a current region of uncertainty of the first mobile device and obtaining a current region of uncertainty of the second mobile device;
   upon detecting the current region of uncertainty of the first mobile device coincides with or has crossed over the at least one line, determining if the current region of uncertainty of the first mobile device is within a predetermined distance from the current region of uncertainty of the second mobile device;
   in response to detecting that the current region of uncertainty of the first mobile device is within the predetermined distance from the current region of uncertainty of the second mobile device, initiating use of the location measurement system to obtain a secondary location measurement pertaining to the first mobile device;
   sending the secondary location measurement to the second mobile device;
   receiving a secondary location measurement pertaining to the second mobile device; and
   updating resolution of the map to display both of the secondary location measurements of the first mobile device and the second mobile device.

2. The method according to claim 1 wherein the location measurement system is more accurate compared to the other location measurement system.

3. The method according to claim 1 wherein determining if the current region of uncertainty of the first mobile device is within the predetermined distance from the current region of uncertainty of the second mobile device includes the first mobile device receiving data for the current region of uncertainty of the second mobile device.

4. The method according to claim 1 wherein the location measurement system is a GPS receiver, WiFi receiver, WiMAX receiver, or a Bluetooth® receiver.

5. The method according to claim 1 wherein the region of uncertainty of the first mobile device is obtained using the other location measurement system, the other location measurement system providing cell tower location information or WiMAX base-station location information.

6. The method according to claim 1 wherein the region of uncertainty of the first mobile device is obtained using the manually inputted data comprising at least one of: a city name, an intersection, a zip code, and a postal code.

7. The method according to claim 1 further comprising displaying a graphical user interface (GUI) on the first mobile device to receive the predetermined distance, wherein the GUI is displayed in an instant messaging conversation with a contact associated with the second mobile device.

8. The method according to claim 1 further comprising determining if the first mobile device is pre-approved to share the region of uncertainty of the first mobile device with the second mobile device, and, if so, automatically sharing the region of uncertainty of the first mobile device with the second mobile device.

9. The method of claim 1 further comprising:
   if the current region of uncertainty of the first mobile device is not within the predetermined distance, computing at least one updated line that bisects a horizontal distance and a vertical distance between the current region of uncertainty of the first mobile device and the current region of uncertainty of the second mobile device.

10. The method according to claim 1 wherein the at least one line includes a vertical line and a horizontal line that respectively bisect the horizontal distance and the vertical distance between the region of uncertainty of the first mobile device and the region of uncertainty of the second mobile device.

11. The method according to claim 1 further comprising:
after determining that the region of uncertainty of the first mobile device is moving closer to the region of uncertainty of the second mobile device within a time period, increasing a frequency at which the first location measurement is obtained.

12. A non-transitory computer readable medium comprising instructions for controlling use of a location measurement system on a first mobile device, the instructions comprising:
the first mobile device obtaining a region of uncertainty of the first mobile device using an other location measurement system or manually inputted data;
the first mobile device receiving data for a region of uncertainty of a second mobile device;
the first mobile device displaying a map of both regions of uncertainty of the first mobile device and the second mobile device;
the first mobile device computing at least one line that bisects at least one of a horizontal distance and a vertical distance between the region of uncertainty of the first mobile device and the region of uncertainty of the second mobile device;
the first mobile device obtaining a current region of uncertainty of the first mobile device and obtaining a current region of uncertainty of the second mobile device;
upon the first mobile device detecting the current region of uncertainty of the first mobile device coincides with or has crossed over the at least one line, the first mobile device determining if the current region of uncertainty of the first mobile device is within a predetermined distance from the current region of uncertainty of the second mobile device;
in response to detecting that the current region of uncertainty of the first mobile device is within the predetermined distance from the current region of uncertainty of the second mobile device, the first mobile device initiating use of the location measurement system to obtain a secondary location measurement pertaining to the first mobile device;
the first mobile device sending the secondary location measurement to the second mobile device
the first mobile device receiving a secondary location measurement pertaining to the second mobile device; and
the first mobile device updating resolution of the map to display both of the secondary location measurements of the first mobile device and the second mobile device.

13. The non-transitory computer readable medium of claim 12 wherein the location measurement system is more accurate compared to the other location measurement system.

14. The non-transitory computer readable medium of claim 12 wherein determining if the current region of uncertainty of the first mobile device is within the predetermined distance from the current region of uncertainty of the second mobile device includes the first mobile device receiving data for the current region of uncertainty of the second mobile device.

15. The non-transitory computer readable medium of claim 12 wherein the location measurement system is a GPS receiver, WiFi receiver, WiMAX receiver, or a Bluetooth® receiver.

16. The non-transitory computer readable medium of claim 12 wherein the region of uncertainty of the first mobile device is obtained using the other location measurement system, the other location measurement system providing cell tower location information or WiMAX base-station location information.

17. The non-transitory computer readable medium of claim 12 wherein the region of uncertainty of the first mobile device is obtained using the manually inputted data comprising at least one of: a city name, an intersection, a zip code, and a postal code.

18. The non-transitory computer readable medium of claim 12 wherein the instructions further comprise displaying a graphical user interface (GUI) on the first mobile device to receive the predetermined distance, wherein the GUI is displayed in an instant messaging conversation with a contact associated with the second mobile device.

19. The non-transitory computer readable medium of claim 12 wherein the instructions further comprise determining if the first mobile device is pre-approved to share the region of uncertainty of the first mobile device with the second mobile device, and, if so, automatically sharing the region of uncertainty of the first mobile device with the second mobile device.

20. The non-transitory computer readable medium of claim 12 wherein the instructions further comprise:
if the current region of uncertainty of the first mobile device is not within the predetermined distance, the first mobile device computing at least one updated line that bisects a horizontal distance and a vertical distance between the current region of uncertainty of the first mobile device and the current region of uncertainty of the second mobile device.

21. The non-transitory computer readable medium of claim 12 wherein the at least one line includes a vertical line and a horizontal line that respectively bisect the horizontal distance and the vertical distance between the region of uncertainty of the first mobile device and the region of uncertainty of the second mobile device.

22. The non-transitory computer readable medium of claim 12 wherein the instructions further comprise:
after determining that the region of uncertainty of the first mobile device is moving closer to the region of uncertainty of the second mobile device within a time period, increasing a frequency at which the first location measurement is obtained.

23. A first mobile device comprising:
a location measurement system;
an other location measurement system;
a display;
a communication system; and
a processor configured to at least:
obtain a region of uncertainty of the first mobile device using the other location measurement system or manually inputted data;
receive data for a region of uncertainty of a second mobile device using the communication system;
display a map of both regions of uncertainty of the first mobile device and the second mobile device;

compute at least one line that bisects at least one of a horizontal distance and a vertical distance between the region of uncertainty of the first mobile device and the region of uncertainty of the second mobile device;

obtain a current region of uncertainty of the first mobile device and obtaining a current region of uncertainty of the second mobile device;

upon detecting the current region of uncertainty of the first mobile device coincides with or has crossed over the at least one line, determine if the current region of uncertainty of the first mobile device is within a predetermined distance from the current region of uncertainty of the second mobile device;

in response to detecting that the current region of uncertainty of the first mobile device is within the predetermined distance from the current region of uncertainty of the second mobile device, initiate use of the location measurement system to obtain a secondary location measurement pertaining to the first mobile device;

send the secondary location measurement to the second mobile device;

receive a secondary location measurement pertaining to the second mobile device; and update resolution of the map to display both of the secondary location measurements of the first mobile device and the second mobile device.

\* \* \* \* \*